(12) United States Patent
Schneider et al.

(10) Patent No.: US 11,597,549 B2
(45) Date of Patent: Mar. 7, 2023

(54) BOTTLE TRAY AND STORAGE STATION

(71) Applicant: AUTEFA Solutions Germany GmbH, Friedberg (DE)

(72) Inventors: Jan Schneider, Olching (DE); Lorenz Sailer, Friedberg (DE); Peter Obert, Hennhofen (DE); Peter Knobloch, Gersthofen (DE); Rudolf Kuhn, Neusäß (DE)

(73) Assignee: AUTEFA SOLUTIONS GERMANY GMBH, Friedberg (DE)

( * ) Notice: Subject to any disclaimer, the term of this patent is extended or adjusted under 35 U.S.C. 154(b) by 318 days.

(21) Appl. No.: 16/984,579

(22) Filed: Aug. 4, 2020

(65) Prior Publication Data
US 2021/0300608 A1    Sep. 30, 2021

(30) Foreign Application Priority Data

Mar. 27, 2020 (DE) ................... 20 2020 101 678.4
Jun. 29, 2020 (DE) ................... 20 2020 103 718.8

(51) Int. Cl.
*B65D 1/22* (2006.01)
*B65B 21/14* (2006.01)
(Continued)

(52) U.S. Cl.
CPC .......... *B65B 21/14* (2013.01); *B65D 71/0088* (2013.01); *B65G 1/06* (2013.01);
(Continued)

(58) Field of Classification Search
CPC .... B65D 1/22; B65D 19/002; B65D 71/0088; B65B 21/14; B65G 1/06
(Continued)

(56) References Cited

U.S. PATENT DOCUMENTS 4,730,730 A * 3/1988 Clarkson ................ B65D 71/10
                                                         53/448
4,911,303 A * 3/1990 Andersson ......... B65D 21/0213
                                                         206/509
(Continued)

FOREIGN PATENT DOCUMENTS

DE         2211793 A        9/1973
DE       68905048 T2        9/1993
(Continued)

OTHER PUBLICATIONS

US 2020/0140145 A1, Huizingh, May 7 (Year: 2020).*

*Primary Examiner* — Douglas A Hess
(74) *Attorney, Agent, or Firm* — McGlew and Tuttle, P.C.

(57) ABSTRACT

A storage station, a process for storing, and a bottle tray (5) configured for receiving a bottle layer (7) are provided. The bottle tray has an upright side wall (12), with an upper tray opening (13) and a tray bottom (15) connected to the side wall (12). The bottle tray (5) has a movable lifting bottom (18) that lies in the loaded state (5) on the tray bottom (15) and which has a plurality of passage openings (16) for a lifting device (34) for a relative lift between the side wall (12) and the lifting bottom (18). The tray bottom (15) has a perforated plate or a plurality of struts (17) located spaced apart and enclosing the passage openings (16). The struts are fastened to the side wall (12). The bottle tray (5) has a bottom centering (19) acting between the tray bottom (15) and the lifting bottom (18).

20 Claims, 20 Drawing Sheets

(51) Int. Cl.
*B65D 71/00* (2006.01)
*B65G 1/06* (2006.01)
*B65G 47/08* (2006.01)
*B65G 47/256* (2006.01)
*B65G 47/53* (2006.01)
*B65G 47/82* (2006.01)
*B65G 47/91* (2006.01)
*B65G 47/92* (2006.01)
*B65G 15/00* (2006.01)

(52) U.S. Cl.
CPC ......... *B65G 47/082* (2013.01); *B65G 47/256* (2013.01); *B65G 47/53* (2013.01); *B65G 47/82* (2013.01); *B65G 47/91* (2013.01); *B65G 47/92* (2013.01); *B65G 15/00* (2013.01); *B65G 2201/0244* (2013.01)

(58) Field of Classification Search
USPC ............................................ 108/52.1; 53/448
See application file for complete search history.

(56) References Cited

U.S. PATENT DOCUMENTS

| | | | |
|---|---|---|---|
| 4,976,343 A | 12/1990 | Fuller | |
| 5,197,396 A * | 3/1993 | Breezer | B65D 19/0012 108/56.1 |
| 5,275,302 A * | 1/1994 | Uitz | B65D 19/0097 220/4.28 |
| 6,408,770 B1 * | 6/2002 | Mason | B65D 19/38 108/54.1 |
| 6,416,271 B1 * | 7/2002 | Pigott | B65D 11/10 414/422 |
| 7,316,103 B2 * | 1/2008 | Ford | B65B 11/105 53/461 |
| 9,487,315 B2 | 11/2016 | Poutot | B65B 5/024 |
| 10,414,528 B2 * | 9/2019 | Ford | B65B 43/50 |
| 10,759,588 B1 * | 9/2020 | Lobisser | B65D 19/02 |
| 11,117,743 B2 * | 9/2021 | MacDonald | G06N 7/00 |
| 11,407,543 B2 * | 8/2022 | Klotz | B65B 13/02 |

FOREIGN PATENT DOCUMENTS

| | | |
|---|---|---|
| DE | 29913237 U1 | 12/2000 |
| DE | 10230524 A1 | 1/2004 |
| DE | 102008026326 A1 | 12/2009 |
| EP | 1204578 B1 | 10/2003 |
| EP | 2052998 A1 | 4/2009 |
| JP | S60251020 A | 12/1985 |
| JP | H04115817 U | 10/1992 |
| WO | 2013005171 A1 | 1/2013 |

* cited by examiner

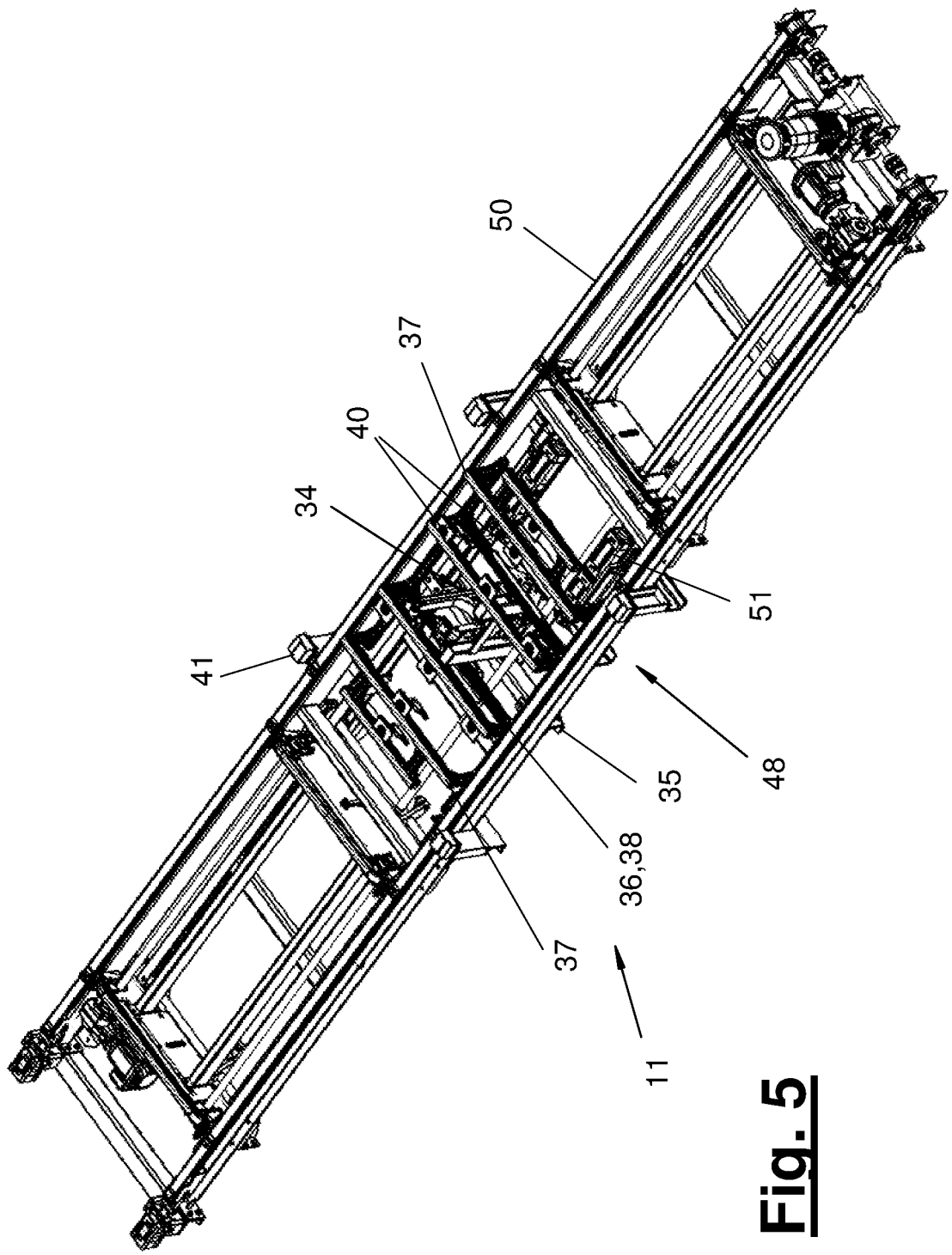

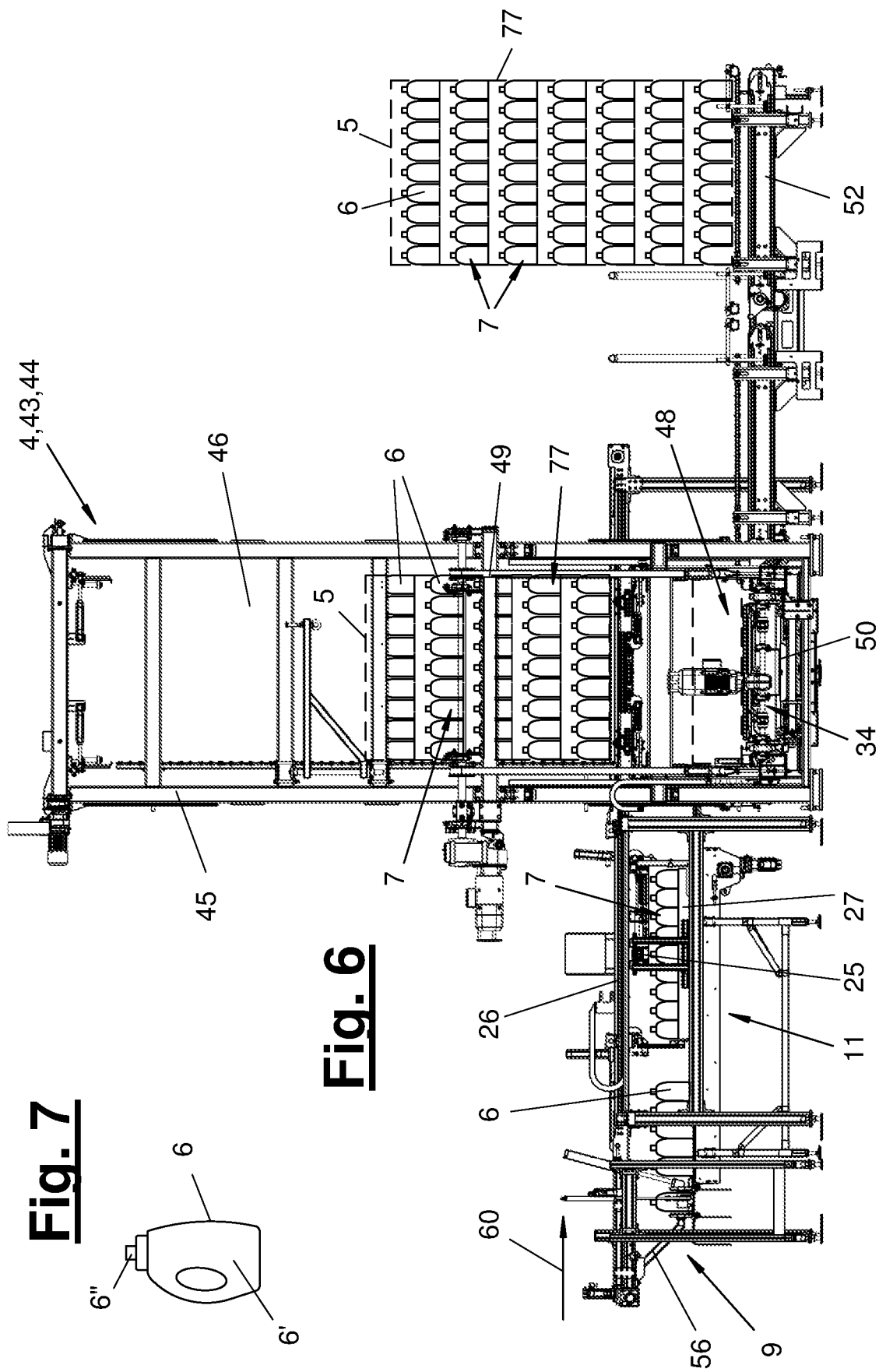

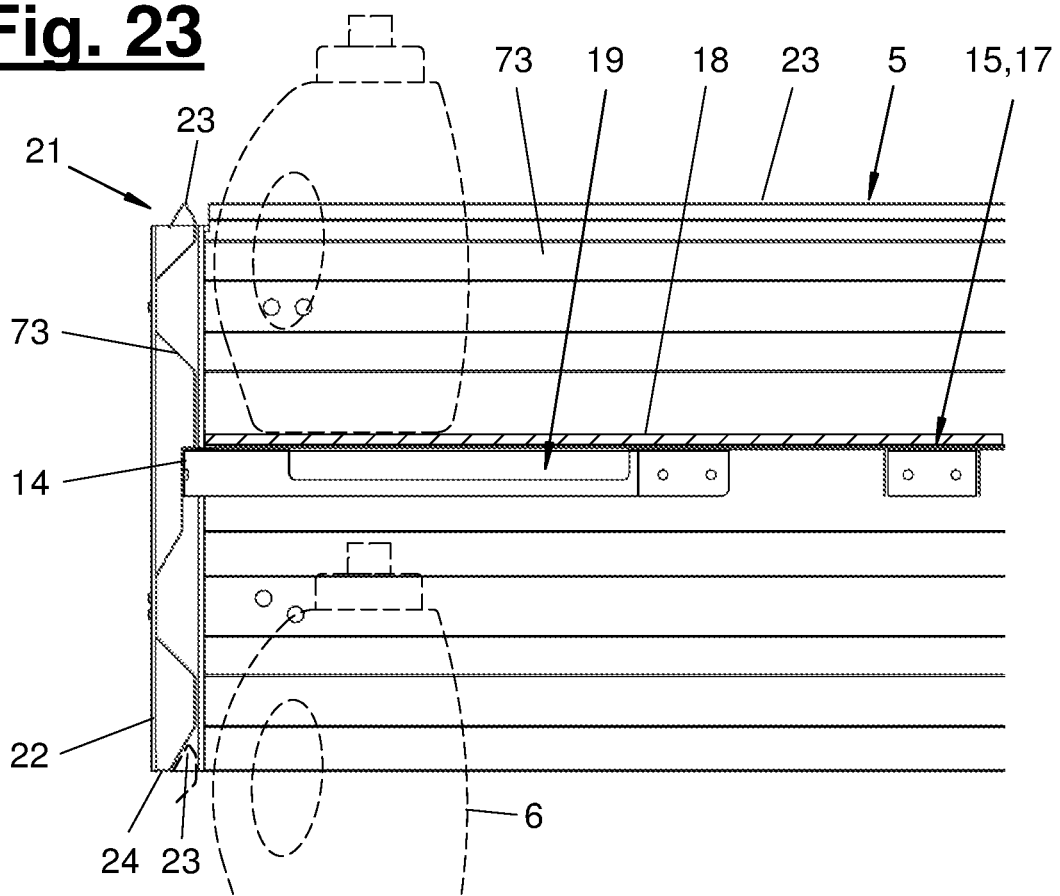
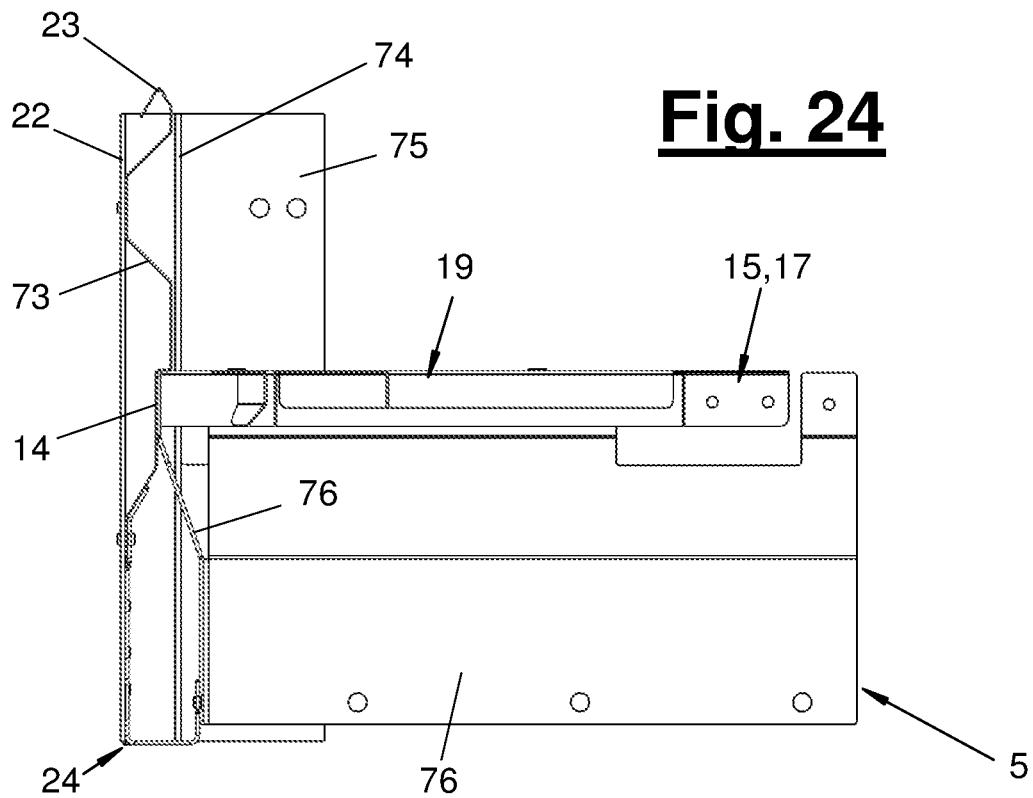

BOTTLE TRAY AND STORAGE STATION

CROSS REFERENCE TO RELATED APPLICATIONS

This application claims the benefit of priority under 35 U.S.C. § 119 of German Applications 20 2020 101 678.4, filed Mar. 27, 2020 and 20 2020 103 718.8, filed Jun. 29, 2020, the entire contents of which are incorporated herein by reference.

TECHNICAL FIELD

The present invention pertains to a bottle tray for receiving a bottle layer and to a storage station as well as to components thereof along with a process for storing a plurality of empty and/or loaded bottle trays in a storage station.

TECHNICAL BACKGROUND

A bottle tray and a storage station along with a process are known from EP 1 204 578 B1. The bottles fed from a feed station are grasped row by row and are loaded into a bottle tray, and a bottle layer is formed in the bottle tray. The bottle tray and the bottle layer are stored together intermediately in a buffer storage unit for further treatment, especially for filling empty bottles. The bottles are removed when needed, and the bottles are unloaded from the bottle layer row by row and are fed to a treatment station, e.g., a filling station. The loading and unloading of the bottle tray is carried out by means of grasping devices, which grasp the bottles at the neck and transfer them with a lifting-over operation. The bottle trays have an upright side wall extending circumferentially rectangularly with an upper tray opening and with a tray bottom connected rigidly to the side wall.

SUMMARY

An object of the present invention is to provide improved bottle treatment technology.

The bottle treatment technology disclosed herein, i.e., the bottle tray and the treatment plant as well as the components thereof along with corresponding processes, have various advantages.

The bottle treatment technology disclosed herein is suitable for all kinds of bottles. This pertains especially to bottles that have a bottle neck that cannot be grasped from the top or can be grasped from the top with difficulty only. These may be bottles with an eccentric or poorly accessible arrangement of the bottle neck, with a non-rotationally symmetrical or not centrally symmetrical cross-sectional contour, with a short or non-graspable bottle neck or with other properties. Such bottles cannot be grasped sufficiently reliably with grippers of the aforementioned state of the art. The bottle treatment technology disclosed herein can also deal with problematic cross-sectional shapes of bottles that have, e.g., a plurality of differently curved arches and that are difficult to be oriented and especially to be lined up in a row in a defined manner.

Bottles are defined as all kinds of hollow and preferably closable containers. Such bottles may have a problematic dimensional stability due to a small bottom area and a relatively great bottle height. They may easily fall over and cause disturbances, especially in the empty state. Empty or filled bottles can be treated with the bottle treatment technology disclosed herein.

The bottles are received in a bottle layer in the bottle tray. The bottle layer is a group of a plurality of bottles, which are arranged in the bottle layer in a defined layer structure, especially in a matrix. The bottle layer may comprise a plurality of rows and columns of bottles that are preferably oriented and arranged in the same manner. Arrangement of the bottles in a regular matrix in the bottle layer is favorable in this connection. It is, however, also possible to arrange rows of bottles with an axial offset next to each other, so that the bottles located in adjacent rows stand in a mutually offset pattern or with a gap between them.

The bottle tray disclosed herein with the movable lifting bottom and with the rigidly connected tray bottom preferably with the plurality of passage openings located there for a lifting device has the advantage that the loading and unloading of the bottle tray can be carried out by pushing over or pushing off a bottle layer onto the lifting bottom located at the upper tray opening in a position favorable for pushing. The bottle layer may have been formed before externally and then pushed completely over the lifting bottom. As an alternative, it is also possible to form a layer on the lifting bottom.

The bottle layer is smaller in terms of its length and width than the receiving interior in the bottle tray. The bottle layer and the lifting bottom may have a base of an essentially equal size. The bottle layer may advantageously have an equal or smaller base size than the lifting bottom. Its base size may, however, also be somewhat larger within the framework of the stability of the bottles than that of the lifting bottom. This can reduce the lateral distance of the bottle to the side wall of the bottle tray, which is favorable for the guiding function thereof. At the same time, the lifting bottom can acquire a sufficient clearance of motion.

The pushing over and the pushing off of the bottles and of the bottle layer offers a high level of operational reliability concerning the positional stability of the bottles. A pushing operation is also favorable for maintaining the intended orientation of the bottles, especially of bottles with an irregular or arched, e.g., also asymmetrical cross-sectional shape. The bottle layer may be held and optionally clamped together during the pushing over or pushing off on a plurality of sides, preferably on all sides.

The lifting bottom may lie on the tray bottom in the loaded state of the bottle tray, and the bottle layer can be accommodated within the side wall of the bottle tray in a protected manner. The tray configuration disclosed herein is favorable for a lifting device, with which a relative lifting is generated between the side wall and the lifting bottom. Raising and lowering of the lifting bottom relative to the stationary and positioned side wall is advantageous, As an alternative, the side wall may also be moved up and down relative to the stationary lifting bottom. In another variant, both the side wall and the lifting bottom may be moved during the relative movement. The passage openings are advantageous for a lifting device and allow the passage and contact thereof with the movable lifting bottom.

The tray bottom may have a plurality of struts fastened to the side wall with passage openings located between them, which make it possible for the lifting device to pass through to come into contact with the lifting bottom. The tray bottom, especially the struts, can ensure a high dimensional stability of the bottle tray. The struts connect the side walls of the bottle tray, which are located opposite, and are advantageous for the dimensional stability of the tray bottom. This is favorable for a reliable loading and unloading of the bottle tray and for the trouble-free relative movement between the lifting bottom and the side wall.

The tray bottom with the one or more passage openings may advantageously be arranged in the central area of the height of the side wall. It may also be fastened here to the side wall, especially at a recess or indentation of the side wall. The overlying lifting bottom is likewise located in this case in this height area. The stroke distance of the relative movement between the lifting bottom and the side wall can be reduced thereby. This arrangement of the bottom is also advantageous for stacking up the bottle trays one on top of another in a tray stack. The bottles can be enclosed in the tray stack securely and on all sides.

Due to the approximately central arrangement of the tray bottom, the bottles can protrude upward through the upper opening of the tray and are covered and enclosed in the stack by the lower area of the next higher bottle tray in the manner of a cap. A recess (indentation) of the side wall has, furthermore, advantages for the lateral guiding of the bottles or of the bottle layer in the bottle tray. It is also advantageous for centering the tray and for a centering meshing of bottle trays stacked up one on top of another. The centering of the tray secures the tray stack. The recess or indentation can be spaced laterally from the bottles in a trouble-free manner. The recess (indentation) ensures, in addition, a higher mechanical stability of the side wall.

A bottom centering acting between the lifting bottom and the bottle tray, especially the tray bottom, is especially favorable. This may be formed, e.g., by means of obliquely arranged centering units in corner areas of the tray bottom and the lifting bottom or in another manner. The centering units are arranged, e.g., on the underside of the lifting bottom, on the one hand, and at or in the tray bottom, on the other hand. They mesh with one another during the vertical relative movement of the lifting bottom and the side wall in a positive-locking manner.

The bottom centering defines the position of the lifting bottom in the bottle tray and prevents unfavorable and interfering movements of the lifting bottom during transportation. It improves the absence of interference during the loading and unloading operation. In particular, the position of the bottle layer in the bottle tray as well as for the pushing over and pushing off are defined better and more precisely.

The bottle tray may have, furthermore, a position centering for the bottle layer. For example, centering strips, which can be extended inwards from the side wall and can preferably be actuated remotely, or other centering units, e.g., inflatable tubes, may be present to this end on the inner side of the side wall.

The loading device disclosed herein and the corresponding process are used to load and unload a bottle tray with a bottle layer. The loading device and the loading process have an independent inventive significance. They are especially suitable for the bottle tray mentioned in the introduction, but they may also be used for other bottle trays. In general, there is a suitability for a bottle tray, which has an upright side wall extending circumferentially rectangularly, an upper tray opening and a preferably loosely inserted, movable lifting bottom as well as a bottom-side passage opening. Such a bottle tray may also do without a tray bottom provided with the side wall. The side wall may form a peripheral frame in this case and may also have an individual large tray opening or passage opening on the underside.

The loading device disclosed herein has a layer pusher for a monoaxial or multiaxial pushing of a bottle layer and a lifting device for a relative lifting movement between the side wall and the movable lifting bottom. The layer pusher and the lifting device are controlled such that the layer pusher pushes a bottle layer over the lifting bottom or pushes it off from the lifting bottom when the lifting device has brought the lifting bottom in the bottle tray into a position favorable for pushing at the upper tray opening. The top side of the lifting bottom may now close flush with the top edge of the side wall or be arranged above this. The lifting device is arranged at a loading location, at which the loading and unloading of the lading tray takes place.

The loading device may have an adjoining loading table. It may also comprise an additional distributing table, onto which, for example, the bottle layer can be pushed over with a layer pushing movement along a second axis. A plurality of bottle layers can be fed to or removed from the loading device in parallel via the distributing table. A bottle conveyor, e.g., a belt conveyor, a funnel or the like may also be present instead of such a table.

The loading device may have a positioning device for the bottle tray at the lifting device. It may have, furthermore, a layer conveyor arranged upstream or downstream of the lifting device for a bottle layer. Such a layer conveyor may interact with an optionally connected row-forming or layer-forming device for the bottles. The loading device and said devices may have a common layer conveyor. A layer conveyor may be configured, for example, as an endlessly running conveyor belt.

The lifting device may have a lifting unit, which is capable of reaching through the one or more passage openings, and which acts on the underside of the lifting bottom. Depending on the type of the relative movement, the lifting unit may be stationary or vertically movable. Especially advantageous is an arrangement of a plurality of switchable and adhesive (adhering) holding elements at the lifting unit, e.g., suction cups or electromagnets, which act on the lifting bottom, especially on the underside thereof. The holding elements can hold the lifting bottom during the pushing over or pushing off of a bottle layer. On the other hand, they do not compromise the relative lifting movement between the lifting bottom and the bottle tray, especially the side wall. In addition, it is favorable that the movable lifting bottom does not dangle during this relative movement of the movable lifting bottom and the bottle layer stands securely. A two-dimensional distribution of the holding elements is advantageous for the reliable holding action. As a result, all the forces and torques possibly acting from the outside can be absorbed.

The lifting unit may have one or more strap-like lifting carriers, which are adapted to the passage opening(s), at which they pass through, and which carry one or more holding elements each. A strap-like shape of a carrier is favorable for the accurate positioning of the holding elements in the desired position, especially in the same plane. A strap-like carrier also offers a higher mechanical stability and more possibilities of arrangement for holding elements than does a simple lifting column. The lifting carriers may be connected to one another to form a holding frame. They may be arranged stationarily together or raised or lowered by means of a suitable drive. This is likewise advantageous for the accurate and reliable holding of the lifting bottom and of the bottle layer.

The layer pusher may have a pusher frame, which can extend laterally around the bottle layer. The pusher frame may have a plurality of movable frame parts, which can be laterally adjusted to the bottle layer. The pusher frame may have, in particular, a shape that is rectangular in its top view. The bottle layer can be grasped securely laterally with the frame parts and held in a clampingly closed manner. The bottles can be pushed together tightly in the bottle layer. The pusher frame can carry out the desired pushing movement with the bottle layer by means of a guide with one or more, preferably linear guide axes and by a drive.

The pusher frame may, in addition, be configured for pushing in a bottle layer being conveyed. A frame part arranged on the front side may additionally be configured to this end such that it can be raised and lowered. The lateral frame parts may form here a lateral guide for the bottle layer being conveyed. This is favorable because the bottle layer may be guided laterally and conveyed during its formation from a plurality of rows of bottle layers lined up in a row one after another.

The layer-forming device disclosed herein and the corresponding process are used to form a bottle layer from a plurality of bottles fed individually or preferably row by row. The layer-forming device and the process have an independent inventive significance. They are especially suitable for the bottle tray disclosed herein and for the loading device. However, they may also be used in conventional bottle treatment plants, in which, for example, the bottle layer formed is subsequently grasped with grippers and transferred into a bottle tray with, e.g., a rigid bottom. The loading device may also be configured to this end as a grasping and transfer device.

The layer-forming device disclosed herein has a bottle conveyor, a row guide and a row pusher, wherein a discrete row of layers is formed with the bottle conveyor, and this layer row is then pushed off by the row pusher at right angles to its extension. The so-called row of layers is a row of bottles. The said bottle layer is formed from a plurality of layer rows. The row pusher can bring the layer row to be pushed off to the bottle layer being built and push it to the last layer row thereof and bring it preferably into contact with it.

The layer-forming device may have a cyclically moved layer conveyor, on which the bottle layer is formed. The row pusher pushes the layer rows one after another onto the layer conveyor and forms the bottle layer thereby. At the same time or subsequently, the layer conveyor may move on during the pushing over by the width of one layer row in the conveying direction. An interaction with the loading device disclosed herein and of the layer gripper thereof as well as of the lateral guiding thereof by frame parts is favorable in this connection.

The layer-forming device may have a row guide for the layer row at the bottle conveyor. The row pusher may be configured as a part of the row guide. The row guide may, furthermore, have a guide element, which can be raised and lowered, and which allows the layer row being pushed to pass in the raised position of the row pusher. The row guide and the row pusher may have a strip-like (strip) or plate-like (plate) configuration with a straight extension.

The row-forming device and the corresponding process are used to separate a bottle layer and to form a row of bottles. The row-forming device and the corresponding process have an independent inventive significance. They are especially suitable for the bottle tray disclosed herein and for the loading device disclosed herein. However, they may also be used in conventional bottle treatment plants, in which, e.g., the bottle layer formed is grasped with grippers and unloaded from a bottle tray having, for example, a rigid bottom. The loading device may also be configured to this end as a grasping and transfer device.

The row-forming device has the configuration and the function of taking up the respective frontmost layer row of the bottle layer being moved in a conveying direction row by row and to remove it. This happens in a transport direction that is oriented at right angles to the conveying direction of the bottle layer. The row-forming device may have a transport device with a plurality of parallel conveyor belts, which extend in the transport direction. Three, four, five or more conveyor belts are preferably arranged in parallel next to one another. The row-forming device may have one or more layer conveyors of the above-mentioned type for moving the bottle layer in the conveying direction.

The layer conveyor or the layer conveyors may have a controllable speed, which may be variable if needed. The layer conveyor or the layer conveyors may be moved intermittently or cyclically or continuously in the conveying direction. The conveying speed may optionally be varied in case of a continuous conveying movement.

The variation of the speed may be carried out in different manners. This is favorable, on the one hand, in order to reduce the distances between layers in the conveying direction in case of an arrangement of a plurality of bottle layers. On the other hand, the layer conveyor adjoining said conveying device may have, e.g., periodically short, e.g., pulsating phases of acceleration. After pulling off the frontmost row of bottles by the conveying device, the rest of the bottle layer and especially the bottle row following next may be briefly accelerated and conveyed rapidly as well as positioned at the boundary to the conveying device. The conveying speed may then be reduced again for pulling off the positioned bottle row.

The conveyor belts of the conveying device may be driven and controlled independently. They may be moved and driven continuously or intermittently. The conveyor belts may have variable and possibly mutually different conveying speeds. There may be a gradient, which increases when viewed in the conveying direction of the bottle layer. The conveyor belt located closest to the layer conveyor has the lowest conveying speed, and the conveyor belt located at the greatest distance from the layer conveyor has the highest conveying speed. The speed level may increase continuously between conveyor belts. As an alternative, a pulsating gradient with increasing tendency is possible, in which case the conveying speed of a conveyor belt following in the conveying direction of the bottle layer may also be lower at one time and the conveying speed of the next following conveyor belt may then again be markedly higher.

Further, it is possible to drive the individually driven plurality of conveyor belts of the conveying device at equal speed or to provide a common drive for the plurality of conveyor belts. Independently configured and controllable drives for the plurality of conveyor belts have the advantage that the kinematics of the belts can be adapted to the different requirements of different bottles as needed. The row-forming device can be adapted hereby to different types of bottles and can also be operated alternatingly with different types of bottles.

The conveyor belt located farthest from the layer conveyor may adjoin a next following row conveyor for the bottles. The bottle row formed in the row-forming device is removed by said conveyor belt.

The conveying device may have a guide strip for the bottles, which is oriented obliquely to the conveying direction of the conveyor belts and extends over a part of the conveyor belts. The guide strip may be arranged behind the row conveyor in the conveying direction and may extend to the fastest conveyor belt located in the outermost position when seen in the conveying direction. The oblique guide strip interacts with the conveyor belts having different speeds and ensures a secure contact and guiding of the bottles removed from the bottle layer at and along the guide strip. The increasing speed gradient of the conveyor belts now brings about a reliable and oblique feed of the bottles along the guide strip. The bottles assume now a defined position and orientation at the guide strip.

The conveyor belt that is the first belt when viewed in the conveying direction may have a greater width than the other conveyor belts. The width of the first conveyor belt may be adapted to the width of the layer row and of the bottles of that layer row.

In addition, a guide unit, which is oriented along the conveying direction and which is arranged at the rear edge of the first conveyor belt when viewed in the conveying direction, is favorable. The guide unit may have a strip- or plate-like configuration and may have a straight extension. It can avoid a tilting over of the bottles when the layer row is pushed over from the layer conveyor onto the conveying device. The guide unit may be adjustable, especially removable.

The guide unit may be used, e.g., during an intermittent or cycled movement of the layer conveyor and optionally of the conveying device. The layer conveyor pushes the frontmost bottle row onto the first conveyor belt, which is, for example, stopped, and in contact with the guide unit in a cycled manner, and the conveyor belt then removes the bottle row and the cycle starts again.

The conveying unit may, for example, be removed in case of a continuous conveying movement of the layer conveyor with constant or periodically pulsating conveying speed and continuous conveying movement of the conveying device.

Should a bottle ever happen to have fallen over in the bottle layer or should it ever fall over on the layer conveyor or on the conveying device on its way to the row conveyor, it can be removed at an outlet. This may be located at an edge guide, which defines the row conveyor and optionally the conveying device on the side located opposite the layer conveyor. The edge guide can guide laterally the bottle row having arrived on the row conveyor and optionally on the outermost conveyor belt in the conveying direction.

The row-forming device may have a removal device for the fallen-over or otherwise abnormal bottles. This may have a sensor for detecting a fallen-over or abnormal bottle and an ejector, e.g., a blowing device. The ejector is actuated corresponding to the detection result and it removes the bottle through the outlet.

The row-forming device may further have a turning device, which turns bottles with an incorrect orientation, e.g., incorrect orientation, by preferably 180°. This may happen in the running bottle row on the row conveyor. The turning device may have a sensor for detecting the incorrect orientation and a turning unit, e.g., a rotary gripper. Correction of the incorrect orientations is advantageous, for example, for a filling plant, especially in the case of bottles with an eccentric arrangement of the bottle neck or of the bottle opening.

The storage station disclosed herein and the corresponding process are used to store a plurality of empty and/or loaded bottle trays. It is especially suitable for the bottle trays disclosed herein and for the loading device disclosed herein as well as for the layer- and row-forming devices disclosed herein. The storage station can also be used, as an alternative, with said other bottle trays, loading devices and row-forming and layer-forming devices.

The storage station disclosed herein and the storage function disclosed herein may be used in different manners. They have, e.g., advantages for the intermediate storage of empty bottles between a feed station, e.g., a blowing machine, and a treatment station, e.g., a filling plant. As a result, it is possible to compensate, e.g., differences in capacity between the feed station and the treatment station or to buffer possible disturbances in the conveying flow.

The storage station comprises one or more tray storage units with an integrated loading area for loading and/or unloading the bottle trays. When a plurality of tray storage units are present, each of them may have an integrated loading area, at which either a loading or an unloading of a bottle tray can take place. When the storage station has an individual tray storage unit with a loading location, both loading and unloading of the bottle tray can take place here. The unloaded and loaded bottle trays can remain in the storage station due to the integrated loading location and circulate here. They do not have to leave the storage station.

The storage station may further comprise a tray stack storage unit, in which a plurality of loaded and/or empty tray stacks can be stored as needed. The tray stack storage unit may be joined to one or more tray storage units. Stacking up and/or unstacking of bottle trays can take place in a tray storage unit. Tray stacks formed may be stored in the tray stack storage unit and moved with stack conveyors as needed. Tray stacks can be conveyed with one or more tray conveyors between the tray storage unit or tray storage units and optionally the tray stack storage unit.

A loading device of the configuration disclosed herein or of the other configuration mentioned may be arranged at the tray storage unit. The loading device may have a movable layer pusher for pushing a bottle layer between a side wall and a movable lifting bottom of the bottle tray. The lifting device may be arranged now at said loading area of a tray storage unit.

The individual tray storage unit and the plurality of tray storage units present may have at least one storage area for receiving a plurality of bottle trays and a storage conveyor for bottle trays. The storage conveyor can connect the respective storage area with the loading area and with the lifting device.

The storage area or the storage areas may have any desired and suitable configuration, e.g., a configuration as a stack storage unit, as a bay storage unit or another configuration. A plurality of storage areas are preferably present, and empty bottle trays are present in one storage area and loaded bottle trays with a bottler layer are present in another storage area. The introduction and the removal of the bottle trays into and from the storage area in question may be carried out by means of an adapted storage device.

A loaded bottle tray can be transported by the storage conveyor to the loading location, unloaded there and then transported, empty, further to the other storage area. Conversely, this is also possible in connection with the loading of an empty tray and its introduction into the storage area.

The storage conveyor may have lifting units. As a result, the bottle trays can be brought into different function levels. A tray conveyance along the preferably straight storage conveyor may take place at an upper level. A bottle tray can be deposited in a lowered position onto a positioning device at the loading location and positioned for loading and/or unloading. On the other hand, transfer of the bottle tray to the storage device or, conversely, taking over of the tray from the storage device may take place on lowering at a storage area.

The present invention also pertains to a bottle treatment plant and to a treatment process, which comprises at least one of the components disclosed herein, namely a bottle tray, a loading device, a layer-forming device and a row-forming device as well as a storage station along with corresponding processes. The bottle treatment station may contain a feed station, which is configured, e.g., as a bottle producer, especially as a blowing machine. As an alternative, a packing device is possible, which unpacks the packing unit containing bottles, which was delivered from the outside. A treatment station of the plant may comprise, e.g., a filling device for the bottles, a palletizing device or the like.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a detail perspective view of the storage conveyor from FIG. 4;

FIG. 6 is a side view of the storage station with the loading device and with the layer-forming device according to FIG. 2;

FIG. 7 is a side view of an embodiment of a bottle;

FIG. 23 is a sectional view through the side wall of the bottle tray at a corner area according to section line XXIII-XXIII in FIG. 18;

FIG. 24 is a sectional view through the side wall of the bottle tray variant at a corner area according to section line XXIV-XXIV in FIG. 20;

FIG. 26 is a front view of the row-forming device according to arrow XXVI in

FIG. 11;

DESCRIPTION OF PREFERRED EMBODIMENTS

Figure 1:
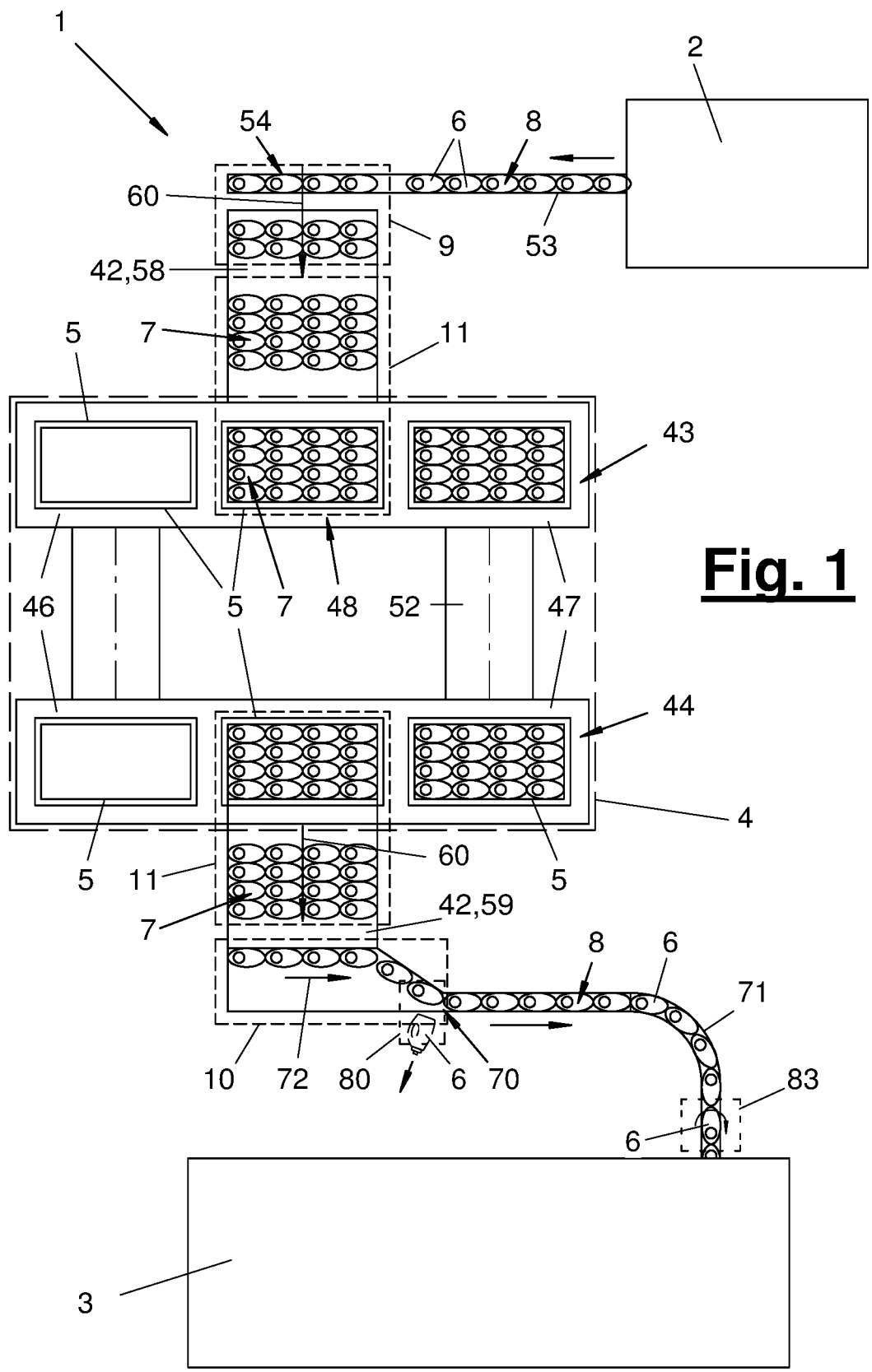
FIG. 1 is a schematic view of a bottle treatment plant with a feed station, with a storage station and with a treatment station as well as with additional components.

Referring to the drawings, the present invention pertains to a bottle treatment plant (1) and to a treatment process for bottles (6). The present invention pertains, in addition, to a bottle tray (5), to a loading device (11) along with a loading process, to a layer-forming device (9) along with the process, to a row-forming device (10) along with the process and to a storage station (4) along with the storage process.

The aforementioned components (4, 5, 9, 10, 11) may be present each individually or as a plurality of components. They may be used in a combination with one another in the bottle treatment plant (1) and in the bottle treatment process.

The aforementioned components (4, 5, 9, 10, 11) have each an independent inventive significance. They may also be used in an only partial combination with one another in a bottle treatment plant (1) and in a treatment process, and conventional other components, e.g., loading devices with grippers, may be used as well. Said components may, further, be used each individually and optionally with conventional other components. The bottle treatment plant (1) and said components (4, 5, 9, 10, 11) may be supplied as original equipment. Said components may also be used to retrofit or retool an existing bottle treatment plant.

FIG. 1 shows in a schematic top view a bottle treatment plant (1) with a feed station (2) of a treatment station (3), with a storage station (4), with a layer-forming device (9), with a row-forming device (10) and with a loading device (11) in conjunction with a bottle tray (5). Further, bottle conveyors are present for conveying the bottles (6) between the individual components of the plant. The feed station (2), the treatment station (3), the storage station (4), the layer-forming device (9), the row-forming device (10) and the loading device (11) as well as the bottle conveyor are each equipped with a control, which controls the functions of the respective station or device. The bottle treatment plant (1) may have a higher-level plant control or process control.

The feed station (2) has, e.g., a blowing machine for plastic bottles, especially PET bottles or HIDE bottles, and/or an unpacking device for bottle packing drums. The treatment station (3) has, e.g., a filling device and/or a palletizing device for empty or filled bottles (6). In addition, other configurations of the stations (2, 3) are possible.

Figure 25:
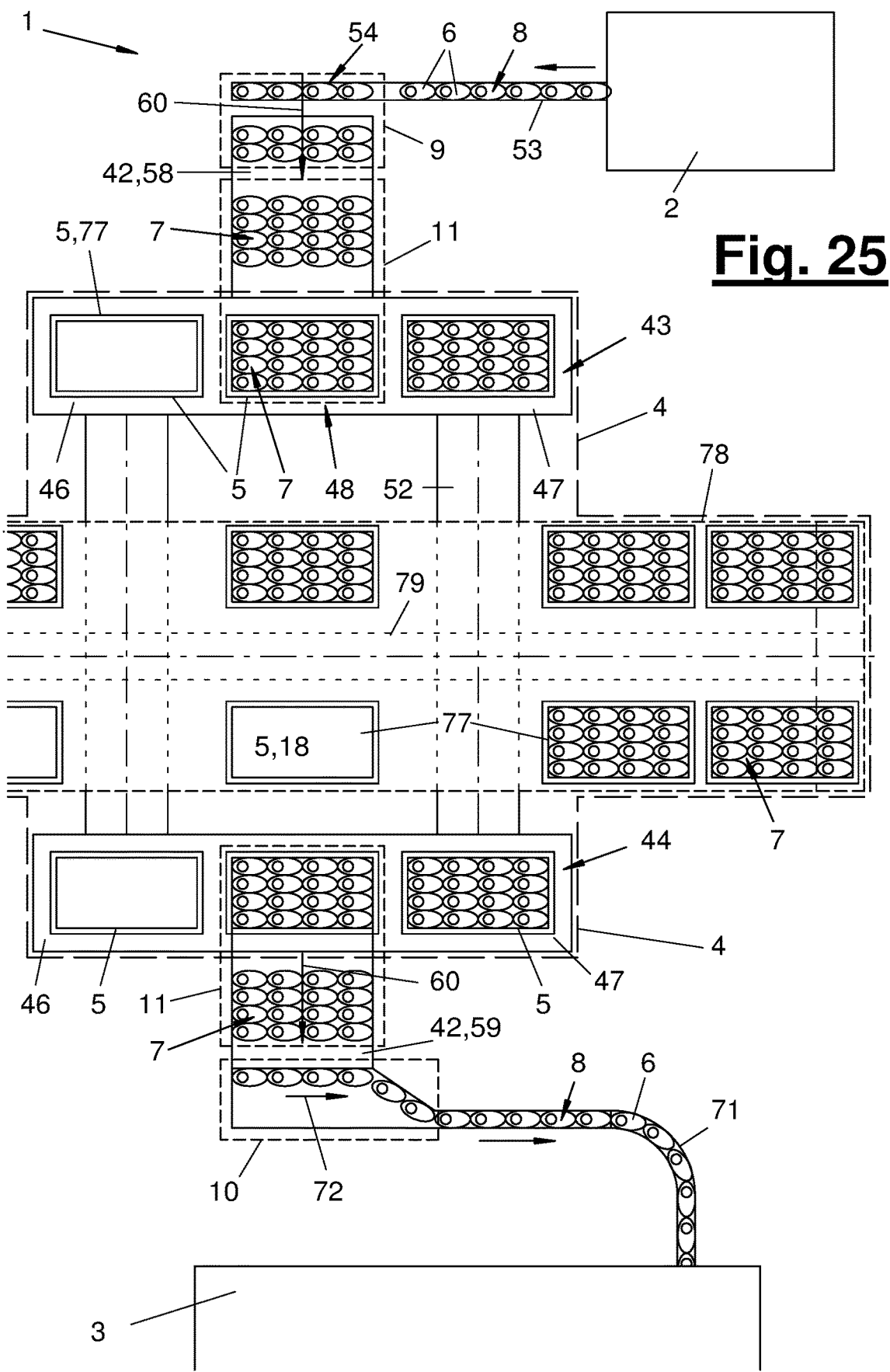
FIG. 25 is a schematic view of a variant of the storage station.

The storage station (4) is used for the intermediate storage of empty and/or filled bottles (6) in bottle trays (5) as needed. In addition, empty bottle trays (5) without bottles (6) may be stored. FIGS. 1 and 25 show two variants for this as examples.

The storage station (4) has, e.g., two tray storage units (43, 44), which are connected to one another and optionally to a tray stack storage unit (78) by one or more tray conveyors. The tray conveyors (52) can convey bottle trays (5) individually or in a tray stack (77). They make possible a change of loaded and unloaded bottle trays (5) between the tray storage units (43, 44) and optionally the tray stack storage unit (78) as well as a tray circuit. As an alternative, the storage station (4) may have an individual tray storage unit or more than two tray storage units (43, 44).

FIG. 25 shows a storage station (4) with a tray stack storage unit (78). This is arranged, e.g., between two tray storage units (43, 44) located at spaced locations from one another and may be connected to these via one or more tray conveyors (52). The tray stack storage unit (78) may have a plurality of, e.g., bottom-side storage places, especially storage aisles, for depositing tray stacks (77) and one or more, preferably automatic stack conveyors (79) for conveying the tray stacks (77) from and to the storage places. The tray stacks (77) may also be deposited and stored on the stack conveyor or stack conveyors (79).

The stack conveyors (79) can be connected or are connected to the tray conveyor(s) (52) and can take over and release tray stacks (77) there. The stack conveyors (79), of which there are, e.g., a plurality, may be arranged in the form of a row next to one another or they may also be crosslinked with one another in a grid-like pattern. They may be configured, e.g., as rail-borne shuttles, as floor-mounted transport vehicles or in another manner.

The bottles are fed to the storage station (4), e.g., from the feed station (2) by means of a bottle conveyor (53) and are released from the storage station (4) to the treatment station (3) by means of a row conveyor (71). The bottles (7) may also be conveyed by a bottle conveyor, not shown, directly from the feed station (2) to the treatment station (3), e.g., when the stations (2, 3) operate in the same cycle.

The bottle trays (5) are loaded each with a fed group of bottles (6), with a so-called bottle layer (7), and are loaded in a tray storage unit (43, 44) and/or in a tray stack storage unit (78). The bottle trays (5) are unloaded for the further treatment of the bottles (6) and the bottles are removed in the form of rows. The loading and/or unloading of the bottle trays (5) is carried out by means of a loading device (11). The layer-forming device (9) is provided for forming a bottle layer (7) and the row-forming device (10) is provided for forming and removing a bottle row.

The bottles (6) are configured, e.g., according to FIG. 7, as hollow and closable containers. They may consist of a plastic, metal or any other desired and suitable material. The bottles (6) may have the asymmetric shape shown with multiple arches. The bottles (6) preferably have an upright shape with a relatively small bottom surface and with a height that is greater than the length or the width of the bottom surface. The bottles (6) shown have a limited positional stability in the upright position. They may possibly fall over, especially when they are empty.

The bottles (6) have a bottle body (6') and, preferably on the top side, an upright, e.g., tubular bottle neck (6"). As an alternative, they may have another type of bottle opening, which will likewise be called bottle neck below. The bottle neck (6") is arranged, e.g., eccentrically. The bottles (6) may have a desired orientation for the treatment, especially filling, and, e.g., the bottle neck (6") is arranged in front of the center of the bottle in the conveying direction.

FIGS. 15 through 24 illustrate the configuration of a bottle tray (5). This is shown schematically in FIGS. 15 and 16. FIGS. 17 through 24 show exemplary configuration details in different views.

The bottle tray (5) has an upright and, e.g., circumferentially rectangularly extending side wall (12). This is formed according to FIGS. 17 through 24 by corner elements (22) and panels (73). In the embodiment shown, the bottle tray (5) is made of metal and, e.g., from bent sheet metals. As an alternative, it may consist of plastic or another material.

Figure 18:
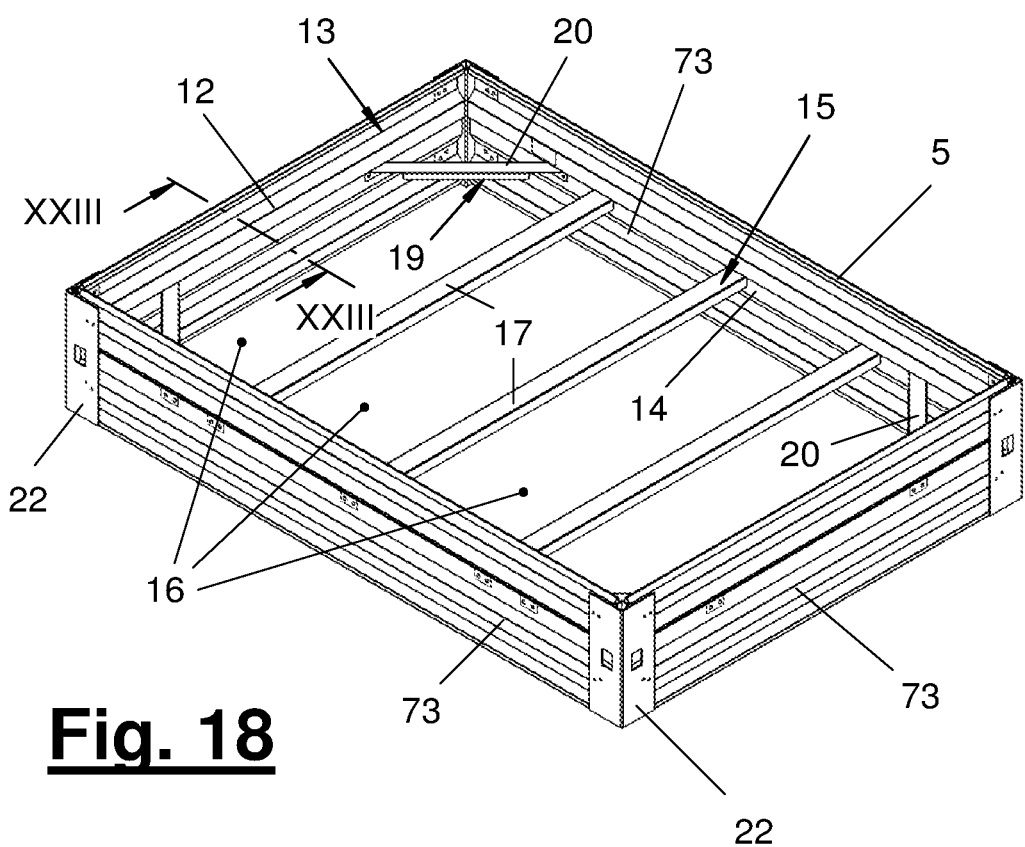
FIG. 18 is a perspective view of the bottle tray according to FIG. 17 without lifting bottom.
Figure 20:
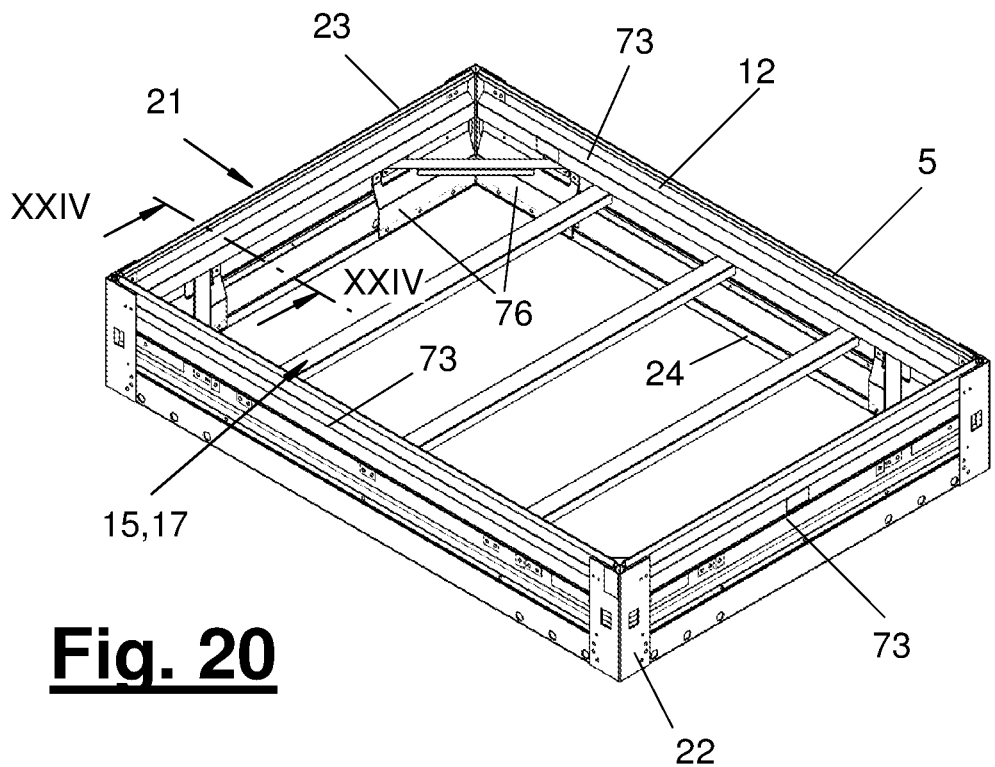
FIG. 20 is a perspective view of a variant of the bottle tray.
Figure 21:
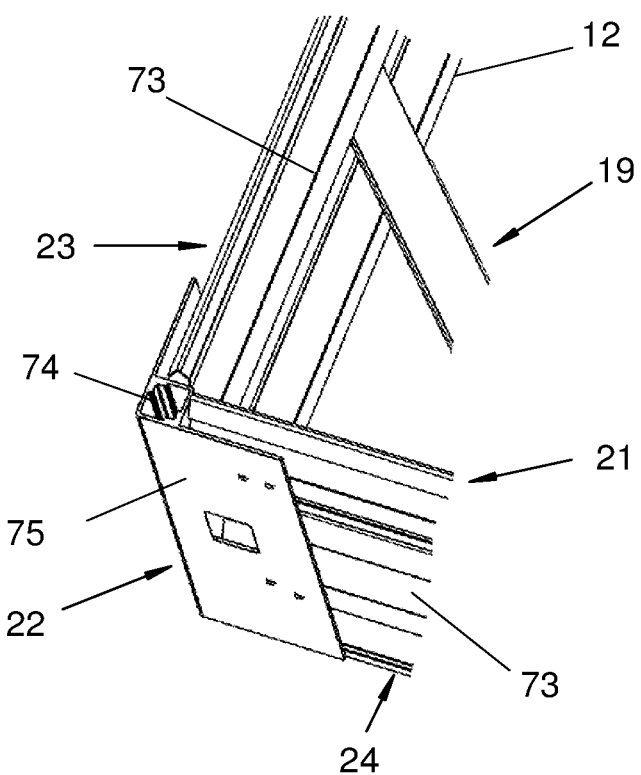
FIG. 21 is a partial perspective view of a corner area of the bottle tray from the top.
Figure 22:
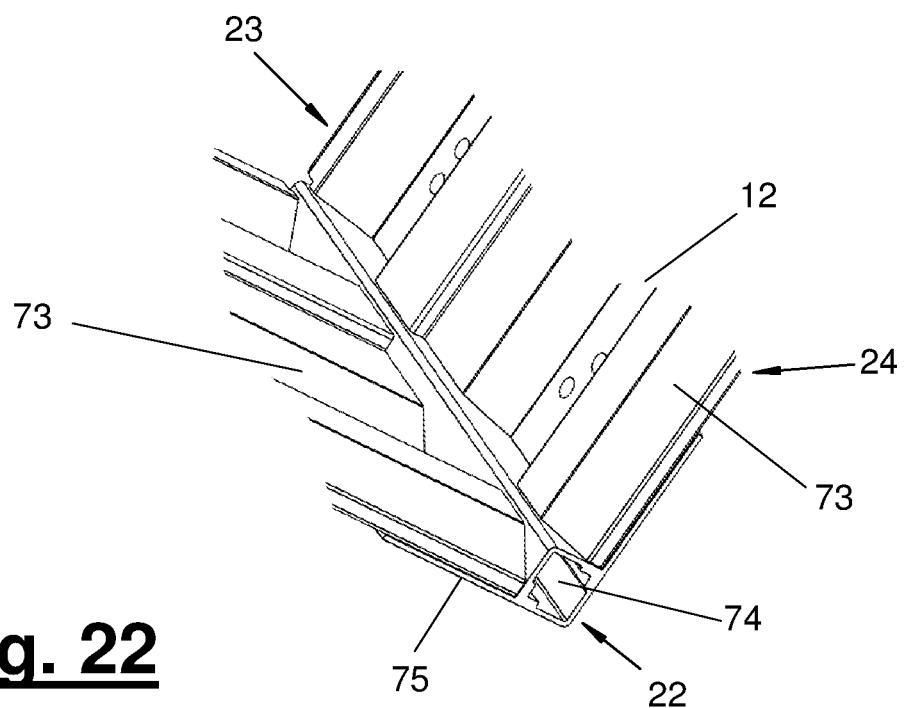
FIG. 22 is a partial perspective view of a corner area of the bottle tray from the bottom.

In both variants, the side wall (12) has an upper edge (23) and a lower edge (24) as well as an upper tray opening (13) enclosed by the side wall (12). FIGS. 18 and 20 illustrate two variants in the configuration of the lower edge (24).

The bottle tray (5) further has a tray bottom (15), which is permanently connected to the side wall (12) and which has a plurality of passage openings (16). The tray bottom (15) has, e.g., a plurality of struts (17) to this end, which are located laterally at spaced locations from one another and abut each against the side wall (12) on the front side and are fastened here, e.g., by welding. Said passage openings (16) are formed between the parallel struts (17). As an alternative, the tray bottom (15) may have a different configuration, e.g., in a grid-like form with mutually crossing struts, as a perforated plate with the passage openings or in another manner.

The bottle tray (5) has a movable lifting bottom (18), which has the shape of a plate and is loosely inserted into the bottle tray (5). The lifting bottom (18) lies on the tray bottom (15) in the loaded state. The lifting bottom (18) is located at a spaced location from the side wall (12) at the edge. The bottle layer (7) stands on the flat lifting bottom (18) in the loaded state. The bottom area of the bottle layer is, e.g., smaller than the area of the lifting bottom.

Figure 15:
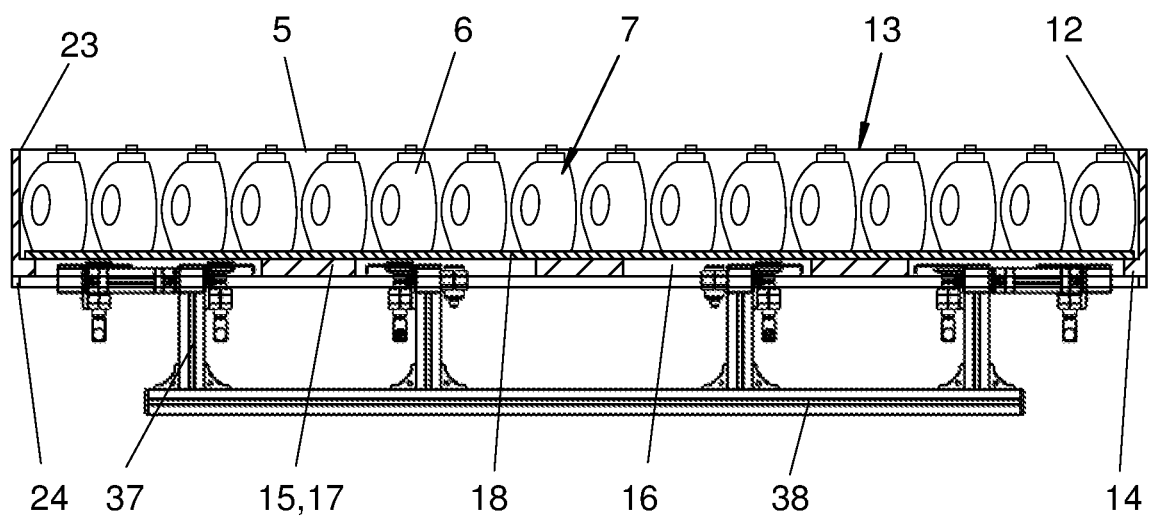
FIG. 15 is a side view of the lifting unit with a bottle tray and with a bottle layer in the loading position.
Figure 16:
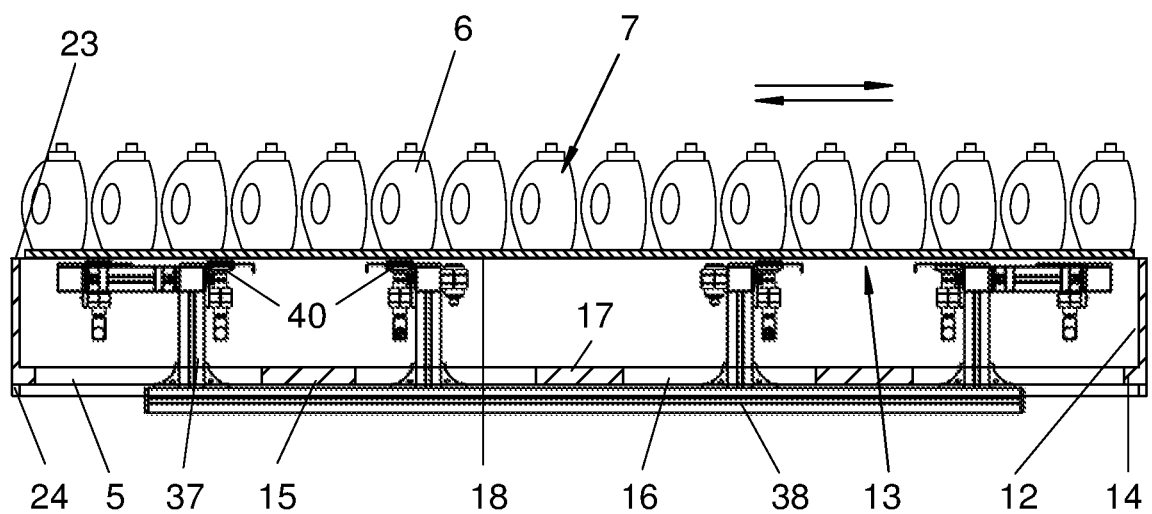
FIG. 16 is a cut-away view of the arrangement according to FIG. 15 in the pushing-off position.
Figure 17:
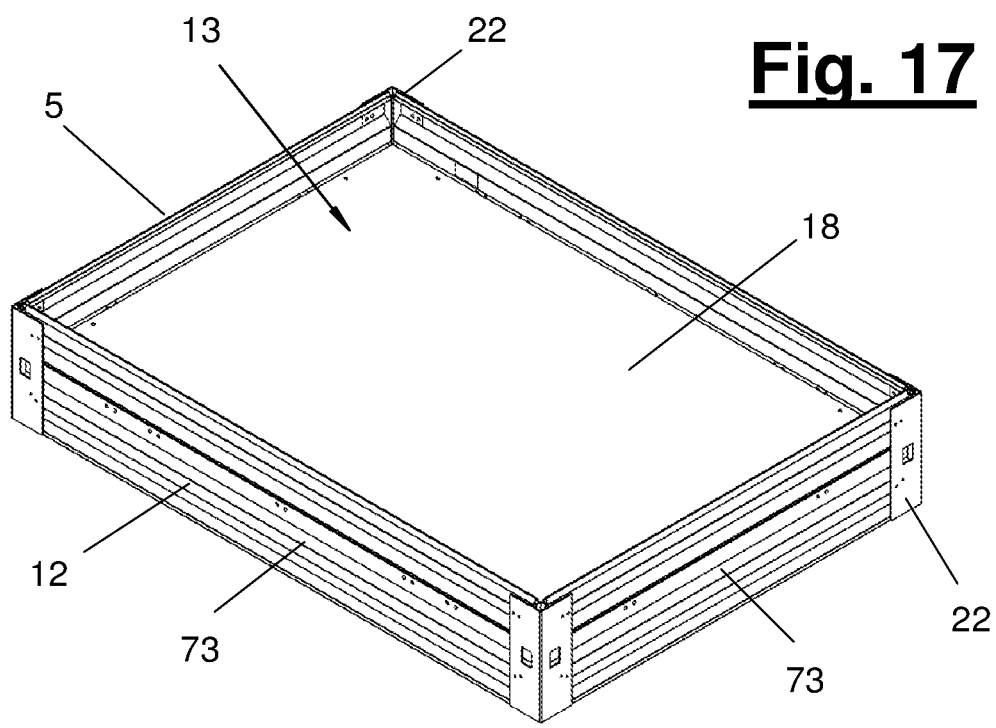
FIG. 17 is a perspective view of a bottle tray with lifting bottom.
Figure 19:
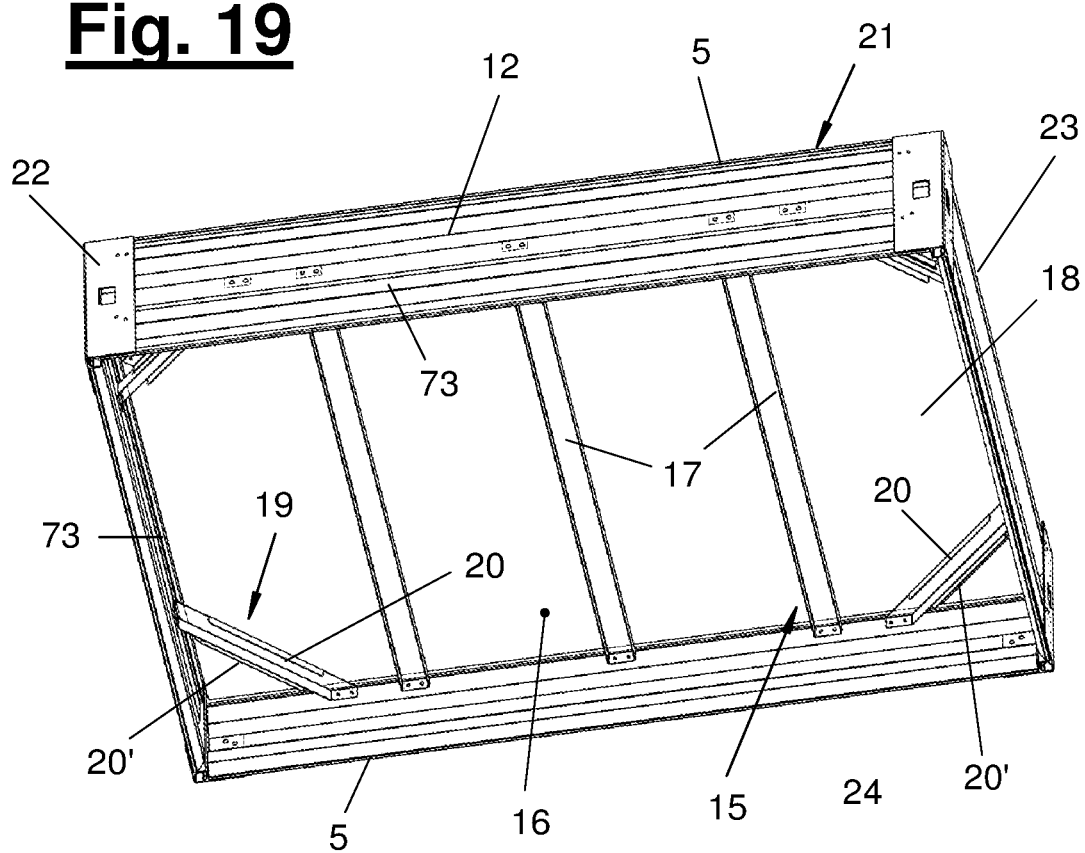
FIG. 19 is a perspective bottom view of the bottle tray from FIG. 17.

FIG. 17 shows the bottle tray (5) with the lifting bottom (18) inserted. The bottle tray (5) is shown in FIGS. 18 and 19 without the lifting bottom (18) in a perspective view with a view from top to bottom. FIGS. 15 and 16 show the lifting bottom (18) and the bottle layer (7).

The tray bottom (15) is arranged in the central area of the height of the side wall. FIGS. 18 and 20 as well as the sections in FIGS. 23 and 24 illustrate this arrangement. The tray bottom (15) adjoins, e.g., a recess or indentation (14) of the side wall (12), which indentation is oriented towards the interior of the tray and is fastened here.

The bottle tray (5) has a bottom centering device (19) for the lifting bottom (18). This centering device (19) acts, e.g., between the tray bottom (15) and the lifting bottom (18). FIGS. 18 through 20 show this arrangement. In the embodiment shown, the bottom centering device (91) has obliquely arranged centering units (20, 20') in the corner areas of the tray bottom (15) and of the lifting bottom (18). These are configured, e.g., as parallel centering strips (20') arranged obliquely in the corner area on the underside of the lifting bottom (18) and as centering bars (20) in the area of the tray bottom (15), which are in contact with one another in a positive-locking guiding manner in the loading position.

The bottle tray (5) further has a tray centering (21), which ensures a centering meshing of the bottle tray (5) in a tray stack (77) with another bottle tray (5). FIG. 6 suggests a tray stack (77).

FIGS. 23 and 24 illustrate this arrangement. The tray centering (21) is formed, e.g., by canted panel edges at the upper and lower edges (23, 24) of the side wall (12). These canted structures are oriented obliquely and in parallel to one another. They mesh in a positive-locking manner on stacking up according to FIG. 23.

The corner elements (22) are formed by an upright corner column (74), e.g., a square profile, and an outside collar (75) bent diagonally, which covers the adjacent panels (73) in some areas on the outside.

The panels (73) project upwards over the corner column (74) and the collar (75) at the upper tray edge (23). At the lower edge (24), the corner column (74) and the collar (75) end at the edge of the panel.

When bottle trays (5) are stacked one on top of another, they stand one on top of another with their corner elements (22) and are guided and held by means of the bottle centering (21) with the obliquely mutually adjacent panel edges in the overlapping area of the adjacent corner elements.

FIGS. 16 and 23 illustrate the position of the bottles (6) in the bottle trays (5) and in the stacked position. The bottles (6) project upwards through the upper tray opening (13) and over the upper tray edge (23) due to the approximately central arrangement of the tray bottom (15) and of the loaded lifting bottom (18) and are covered and enclosed in the tray stack (77) by the hollow lower area of the next higher bottle tray (5) in a cap-like manner.

FIGS. 20 and 24 show a variant of the bottle tray (5). This is suitable, e.g., as a lowermost tray in a tray stack (77) and can provide an especially good supporting effect for the tray stack (77). The bottle tray (5) has an edge reinforcement (76) on the inner side of the side wall (12), which may be arranged especially in the corner area of the bottle tray (5). The edge reinforcement (76) widens the panel (73) formed, e.g., by a canted plate in the lower area. In addition, a U-shaped bottom rail, which offers a flat support surface and closes and covers the corner element (22) downwards, may be arranged at the lower edge (24).

The bottle tray (5) may have a position centering for the bottle layer (7) received. This may comprise, e.g., edge-side guide strips on the inner side of the side wall (12), which are placed inwards and pressed against the bottle layer (7) by the force of gravity, by springs or in another manner. They are configured and arranged such that the lifting bottom (18) can move past at it without collision.

FIG. 15 shows a loading position with the lifting bottom (18) lowered and the picking up of a bottle layer (7) in the bottle tray (5). FIG. 16 shows the lifting bottom (18) in a raised position, in which the top side of the lifting bottom (18) closes flush with the upper edge (23) of the bottle tray (5) or is arranged slightly above it. A bottle layer (7) can be pushed onto the lifting bottom (18) or pushed off for unloading by the loading device (11) in this position. Arrows suggest this pushing movement.

The loading device (11) is arranged at the storage station (4) in the exemplary embodiments shown. In the tray station (4) shown in FIGS. 1 and 25 with two separate tray storage units (43, 44), a loading device (11) can be associated with each tray storage unit (43, 44). With the loading device (11) at the feed-side tray storage unit (43) according to FIGS. 1 and 2, for example, a bottle layer (7) is loaded into a bottle tray (5), which is located to this end at a loading location (48) in the tray storage unit (43). A loaded bottle tray (5) can be unloaded by the loading device (11) at the other discharge-side tray storage unit (44) and the loading location (48) thereof. The bottle trays (5) remain now in the storage station and are conveyed by a storage conveyor (50) explained below to the loading location (48) for the loading and/or unloading operations.

In another embodiment, not shown, a storage station (4) may have only a tray storage unit as well as optionally a tray stack storage unit (78) and only one loading location (48), at which the loading and also the unloading of a bottle tray (5) takes place.

The loading devices (11) for loading and unloading may have the same basic configuration. They comprise a layer pusher (25) for the monoaxial or multiaxial pushing of a bottle layer (7) and a lifting device (34), which brings about a relative lifting movement between the side wall (12) and the movable lifting bottom (18) of the bottle tray (5). The layer pushers (25) and the lifting device (34), which are equipped with corresponding drives (28, 39), are controlled such that the layer pusher (25) pushes a bottle layer (7) onto the lifting bottom (18) or pushes it off from the lifting bottom (18) when the lifting device (34) has brought the lifting bottom (18) in the bottle tray (5) according to FIG. 16 into a position favorable for pushing at the upper tray opening (13).

The lifting device (34) is located in the embodiments shown at the respective loading location (48) in the storage station (4). The layer pusher (25) movable monoaxially or multiaxially by means of a corresponding guide (26) can move to the loading location (48) and to the lifting device (34) and away from these again. The layer pusher (25) can move now into the storage station (4) and also out of this again. This movement may be a monoaxial movement. The layer pusher (25) can also perform a multiaxial, especially biaxial traveling and displacing movement when bottle layers (7) are fed in two or more parallel rows to the loading device (11) or are removed therefrom. The second movement axis may be oriented at right angles to the first axis and parallel to the front side of the storage station (4).

Figure 10:
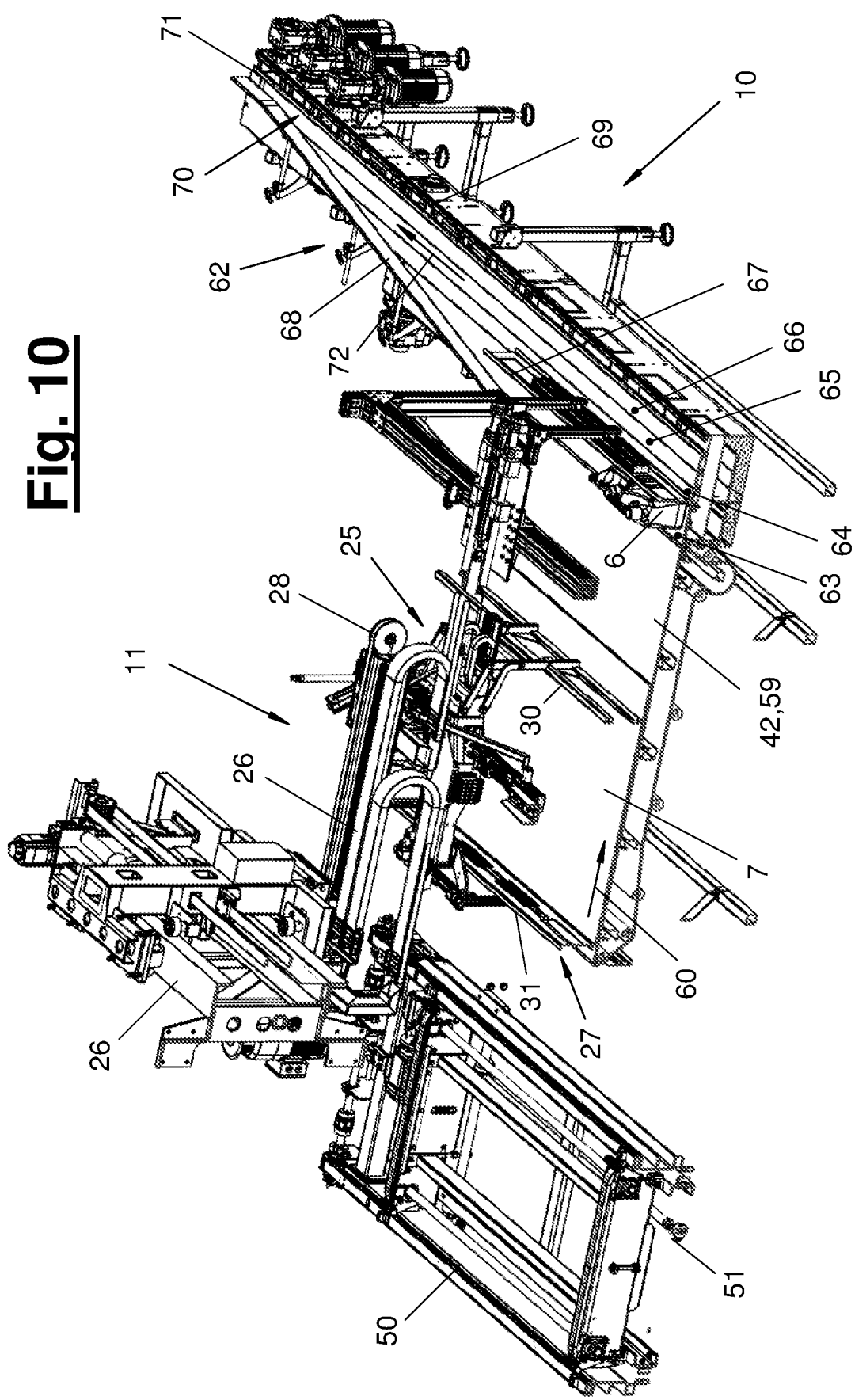
FIG. 10 is a perspective view of a section through the arrangement according to FIG. 9.
Figure 11:
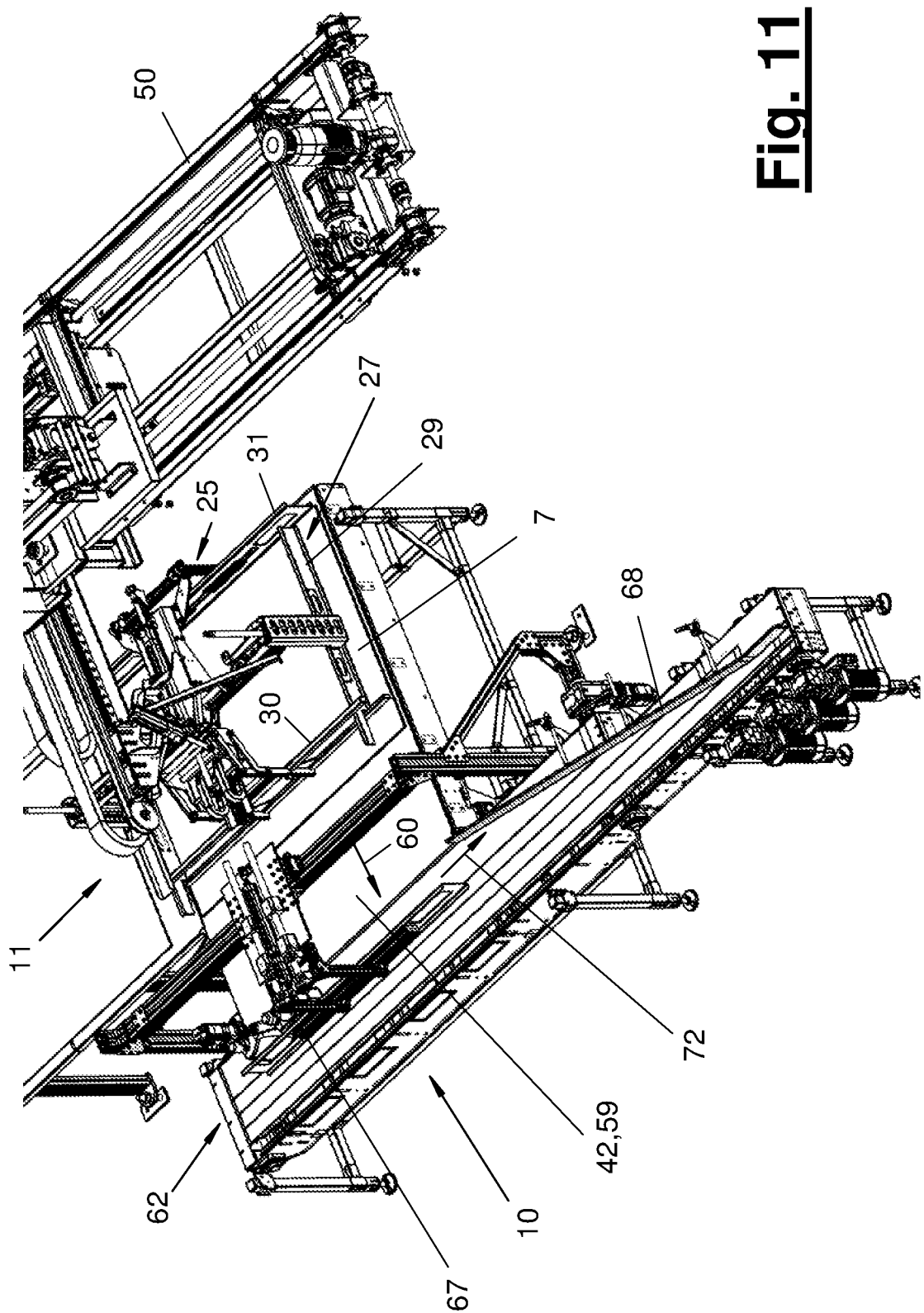
FIG. 11 is an enlarged perspective view of a row-forming device according to FIG. 3.

The loading device (11) may have a layer conveyor (42) arranged upstream or downstream of the lifting device (34) for a bottle layer (7). The layer conveyor (42) may be configured, e.g., according to FIGS. 8 and 10, as an endlessly running conveyor belt driven in a controlled manner. It moves the bottle layer (7) in a conveying direction (60). The layer conveyor (42) may be located at a spaced location from the lifting device (34), and a stationary loading table (32) according to FIGS. 8 and 10 may be arranged between them. The loading table (32) adjoins the lifting device (34) and the lifting bottom (18) located in a raised position. As an alternative, the loading table (32) may be eliminated and the layer conveyor (42) may correspondingly adjoin the lifting device (34).

As is illustrated in FIGS. 5 through 8 and FIGS. 15 and 16, the passage openings (16) at the tray bottom (15) are provided for the lifting device (34) and they make possible the relative lifting between the side wall (12) and the lifting bottom (18). The lifting device (34) has a lifting unit (36) for this, which can grasp through the passage openings (16) and can act on the underside of the lifting bottom (18). In the embodiments shown, the lifting unit (36) is vertically movable and is raised and lowered by a lifting drive (39) relative to a stationary frame (35) with a preferably vertical and straight lifting movement. The bottle tray (5) and the side wall (12) are arranged stationarily now at the loading location (48) and are positioned by a positioning device (41) for the loading and unloading operation. The positioning device may have, e.g., according to FIG. 5, a plurality of stationary positioning stops, at which the bottle tray (5) is held and guided in a suitable manner, and is possibly also locked by clamping units or the like. In another embodiment, the side wall (12) can be raised and lowered relative to a stationary lifting unit (36) with a lifting bottom (18) being supported here.

As is illustrated by FIGS. 13 through 16, the lifting unit (36) has a plurality of switchable and adhering holding elements (40) acting on the lifting bottom (18). These preferably act on the underside of the lifting bottom (18). The adhering holding elements (40) are configured as switchable suction cups in the embodiments shown. As an alternative or in addition, a configuration as switchable electromagnets or in another manner is possible. The holding elements (40) are arranged in a two-dimensional or flat distribution.

Figure 13:
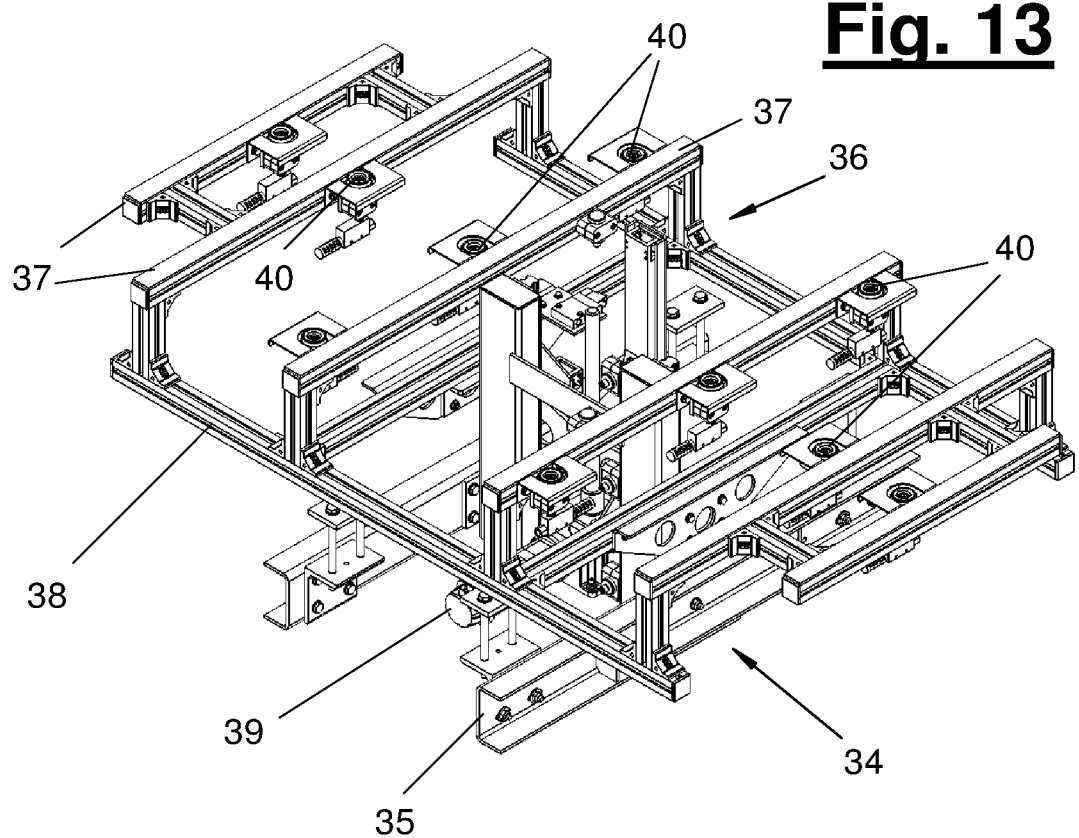
FIG. 13 is a perspective view of a lifting unit of the loading device.
Figure 14:
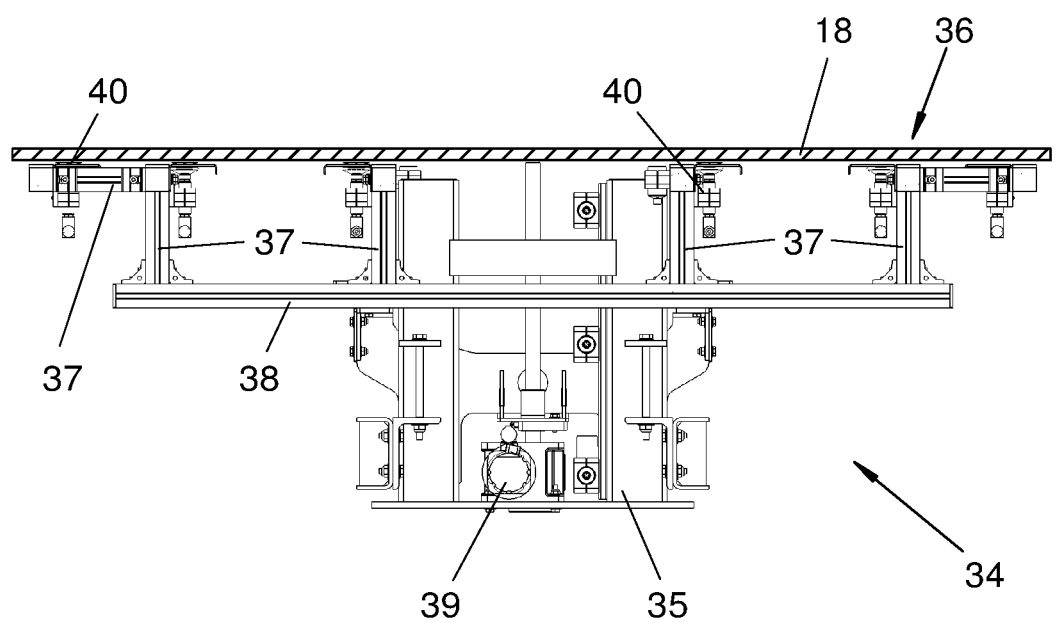
FIG. 14 is a side view of the lifting unit of the loading device.

The lifting unit (36) has a plurality of strap-like lifting carriers (37) in the embodiments shown, which are adapted to the passage openings (16) and can pass through these. The lifting carriers (37) carry one or more holding elements (40) each on their top sides. FIGS. 13 and 14 illustrate this arrangement. The lifting carriers (37) are connected among each other to a lifting carrier frame (38), which is acted on, e.g., by the lifting drive and can be raised and lowered thereby relative to the frame (35). The frame (35) has a suitable guide oriented in the preferred vertical lifting direction for the lifting carrier frame.

The lifting carriers (37) are arranged at the same level with their upper support surfaces and with the holding elements (40) located there and support and hold according to FIGS. 15 and 16 the movable lifting bottom (18) on the underside thereof. The lifting carrier frame (38) and the lifting carriers (37) are shown in FIG. 15 in the raised position for shifting the position.

Figure 2:
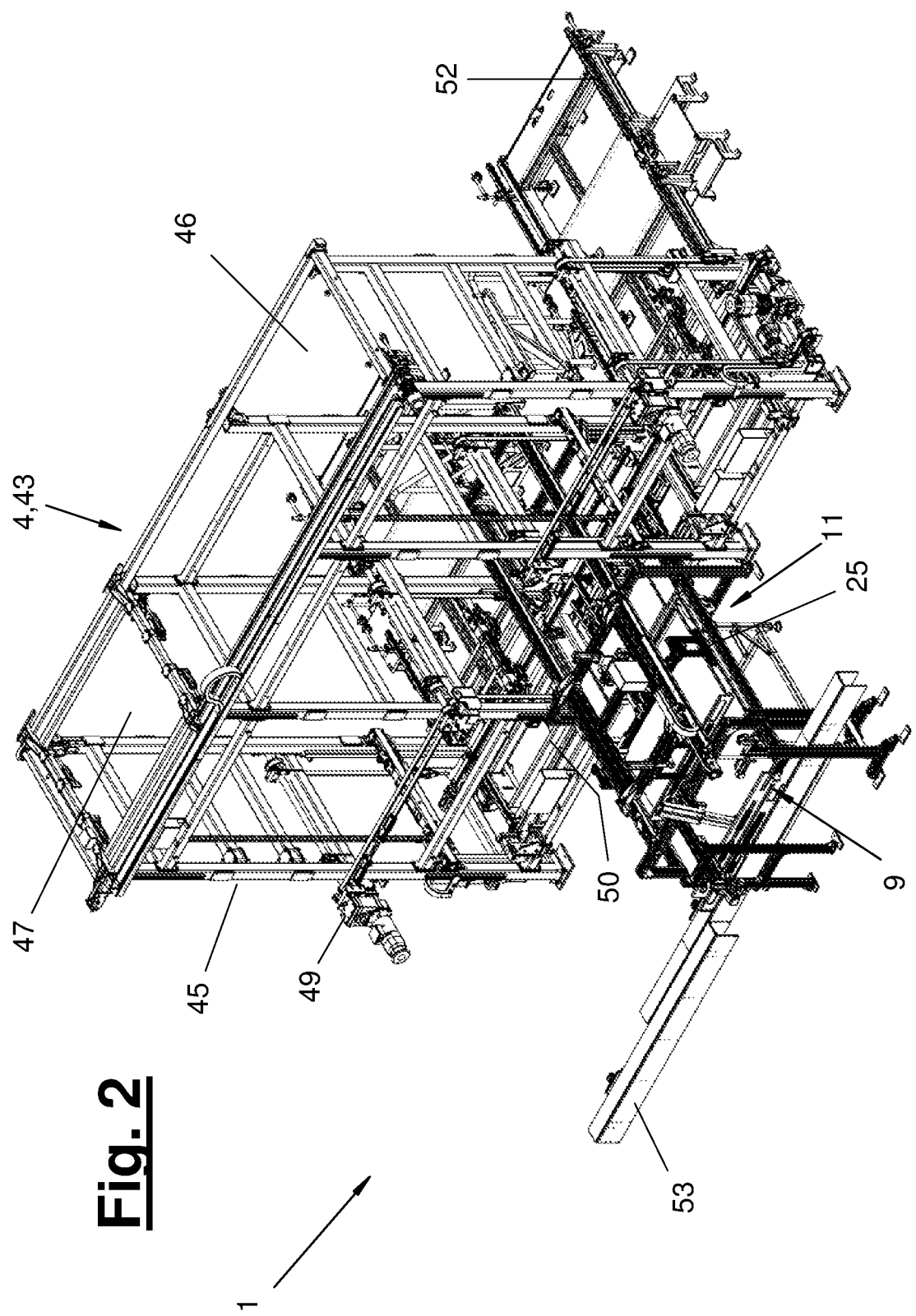
FIG. 2 is a perspective view of a storage station with a layer-forming device and with a loading device.
Figure 3:
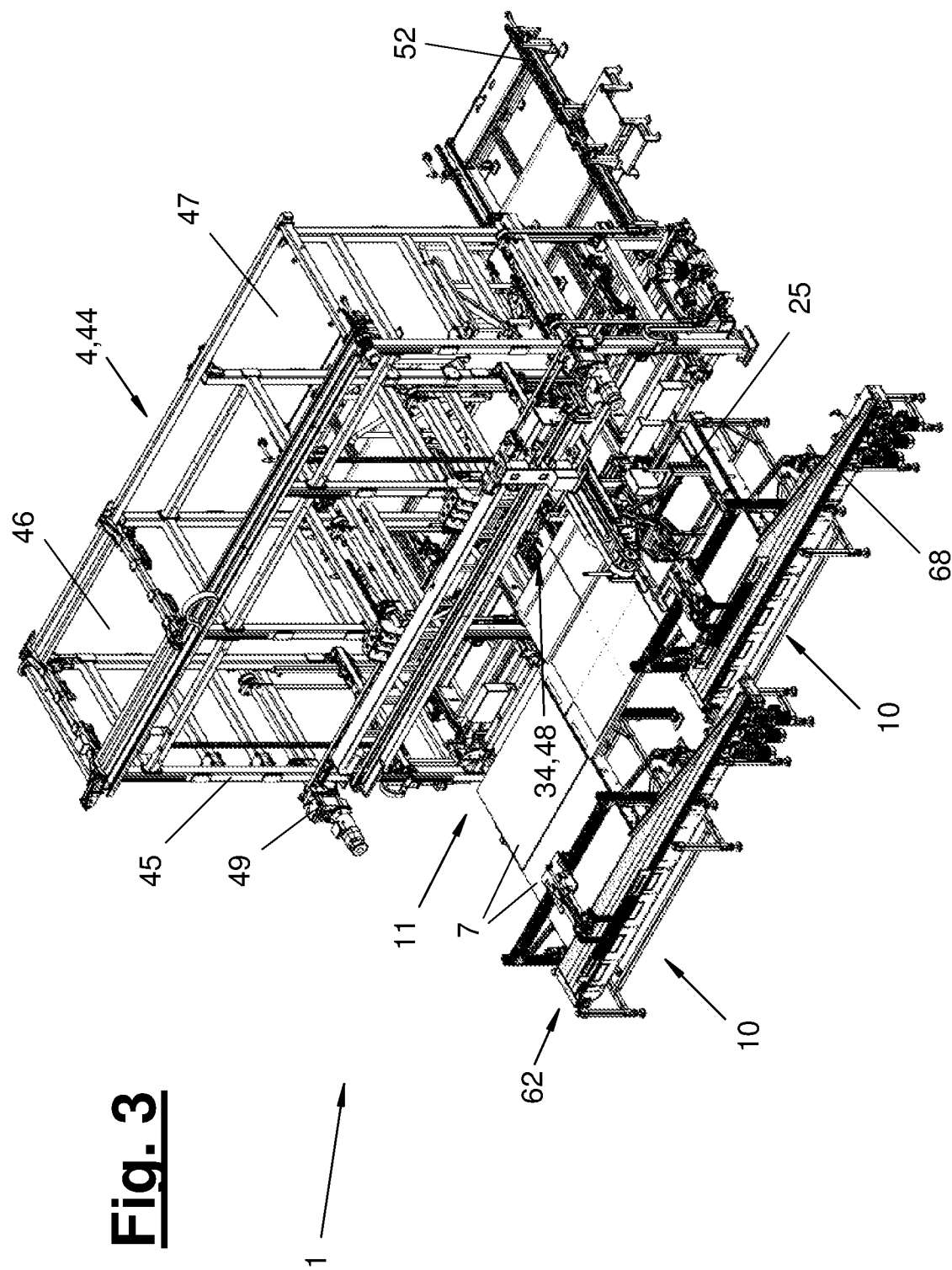
FIG. 3 is a perspective view of a storage station with a loading device and with a row-forming device.
Figure 8:
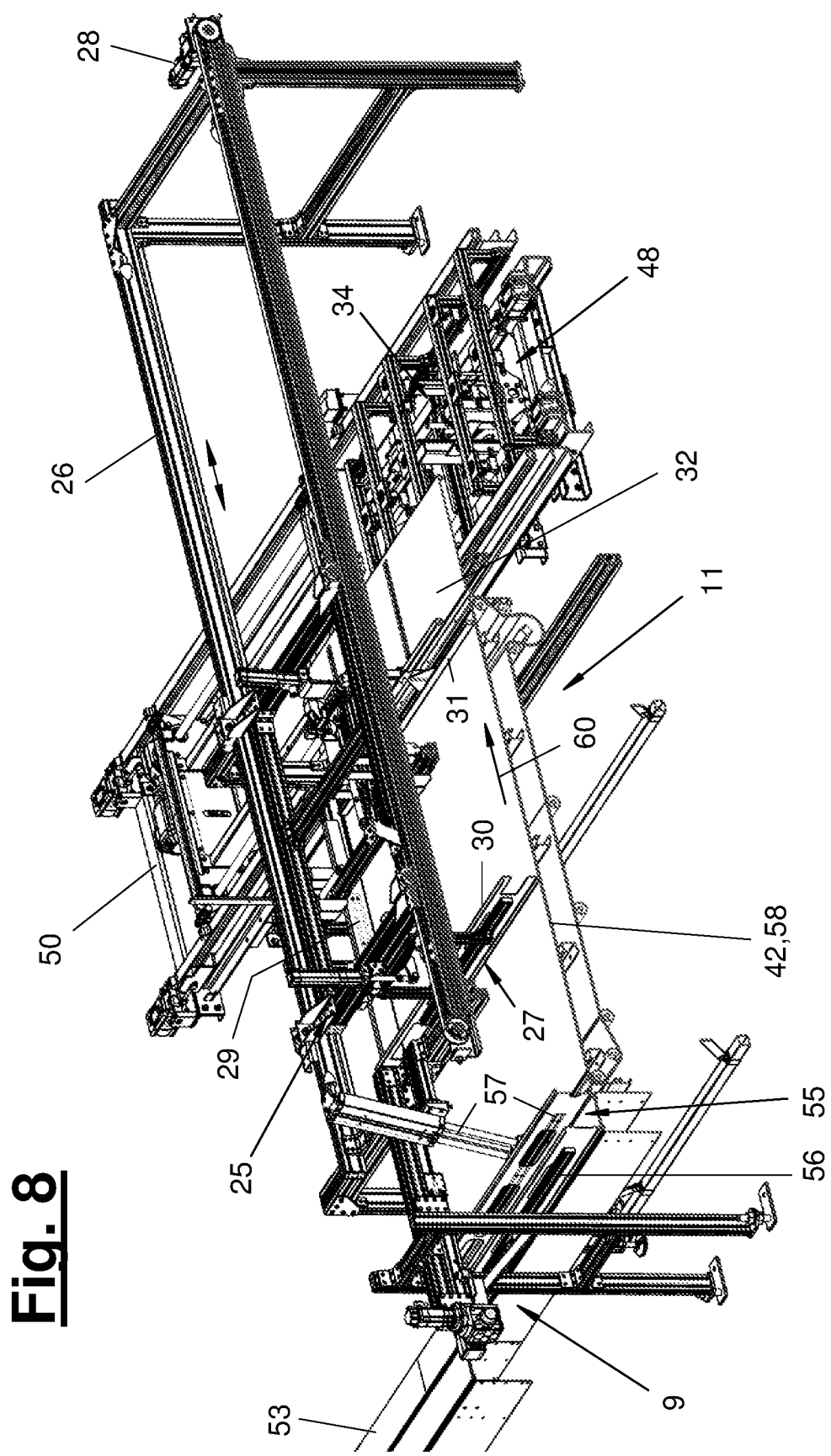
FIG. 8 is a cut-away perspective view of the arrangement shown in FIG. 6 without the embodiment of the storage device.
Figure 9:
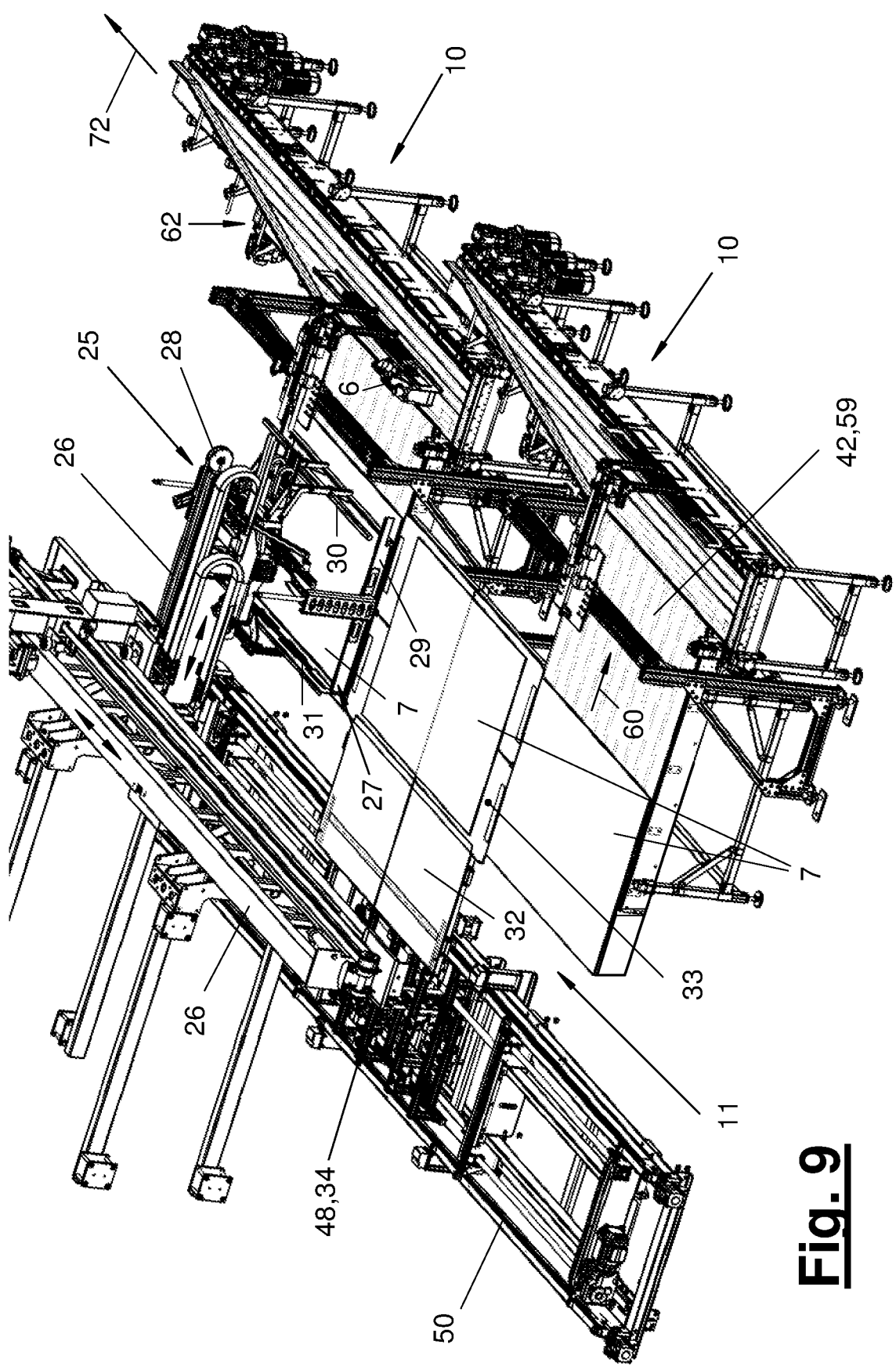
FIG. 9 is a perspective view of the loading device and of the row-forming device according to FIG. 3 with another angle of view and without the storage technology.

The layer pusher (25) is arranged according to FIGS. 2 and 6 as well as in FIGS. 6 through 8 at the guide (26) and can be moved with the drive (28) in the above-described manner monoaxially or multiaxially. The layer pusher (25) comprises a pusher frame (27), which can grasp around and guide the bottle layer (7) on the side. The pusher frame (27) has, e.g., a shape corresponding to the shape of the layer and is rectangular in the top view. The pusher frame (27) has a plurality of frame parts (29, 30, 31), which can be laterally adjusted to the bottle layer (7).

The lateral frame parts (29) are oriented along the conveying direction (60) and they bring about a lateral guiding of the bottle layer (7). The pusher frame (27) makes it possible to push in a conveyed bottle layer (7). It has to this end a front-side frame part (30), which is oriented at right angles to the conveying direction (60). The frame part (30) can be adjusted, on the one hand, on the front side to the bottle layer (7) in the aforementioned manner. In addition, it can be raised and lowered by means of a suitable drive. It can be lifted off upwards and can release the access into the interior of the pusher frame (27) for pushing in a bottle layer (7) being conveyed. The rear frame part (31) located crosswise in the conveying direction can likewise be raised and lowered in the aforementioned manner.

For loading, the pusher frame (27) can be opened on the front side with the frame part (30) raised, and a bottle layer (7) can be conveyed into the pusher frame (27) and then enclosed by the lowered frame part (30) and the other adjusted frame parts (29, 31) on all sides and clamped and held with a certain adjusting force. The bottles (6) are pushed together now tightly in the bottle layer (7).

The layer gripper (25) is then moved with the bottle layer (7) to the loading location (48) and to the bottle tray (5) standing ready there and pushed onto the raised lifting bottom (18). The lifting bottom (18) and the bottle layer (7) can then be lowered after being released by the layer gripper (25) and received in the bottle tray (5). The loaded bottle tray (5) can then be moved from the loading location (48) by the storage conveyor (50) to one of the storage areas (46, 47) and stored or inserted there. Then or at the same time, a new empty bottle tray (5) can be made available for the loading operation at the loading location (48).

Figure 4:
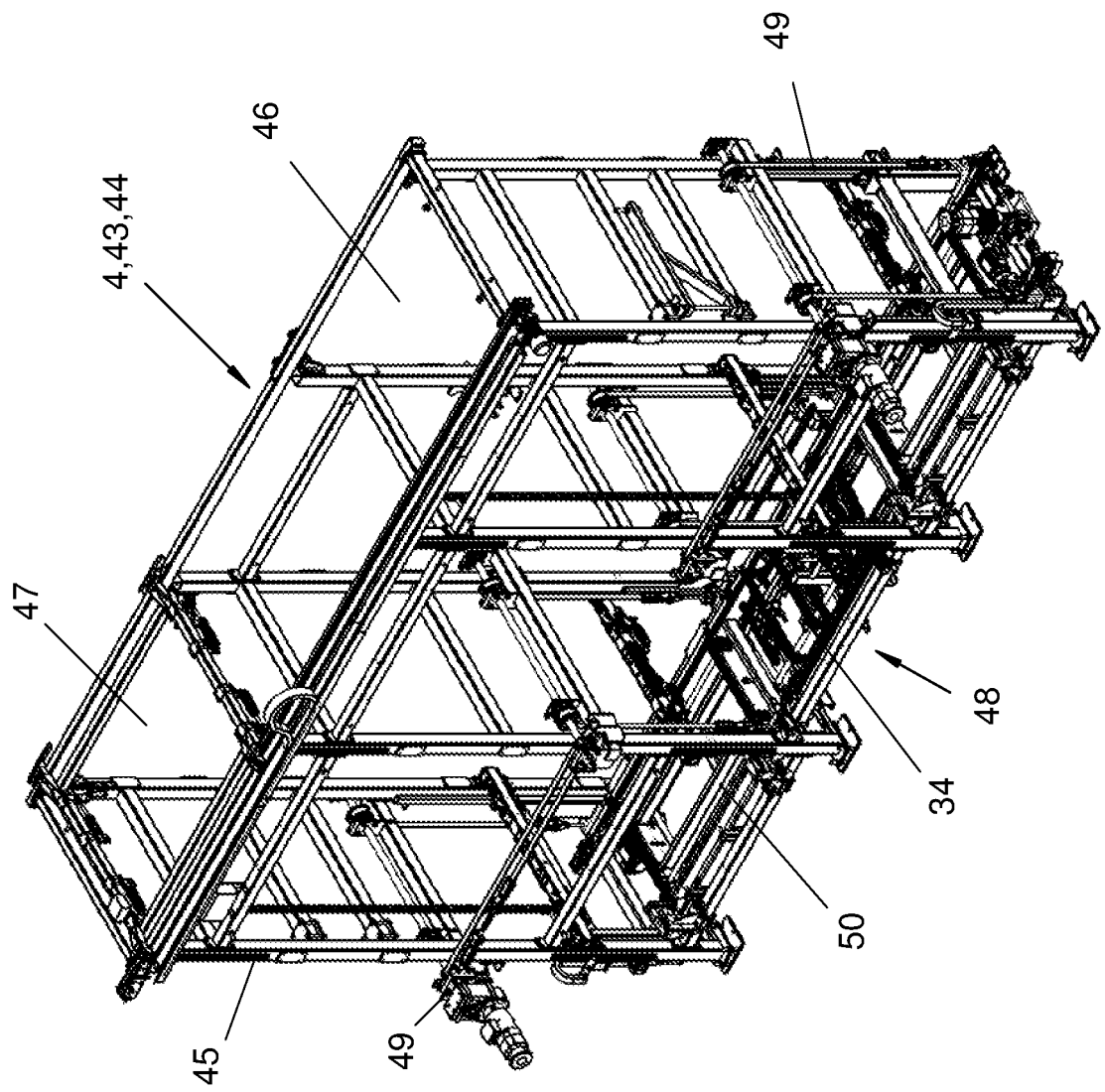
FIG. 4 is a perspective view of the storage station with a loading location and with a lifting device of a loading device as well as with a storage conveyor.

FIGS. 4 and 5 illustrate the configuration of a tray storage unit (43, 44) and of the storage conveyor (50). The tray storage unit (43, 44) has a, for example, frame-like rack (45) and said two or more storage areas (46, 47) as well as the preferably central loading area (48). The storage areas (46, 47) are configured, e.g., for inserting a respective tray stack (77) and have a storage device (49), with which the respective lower bottle tray (5) is adjusted for insertion to the tray stack (77) or removed from the tray stack (77) for removal from storage.

The storage device (49) has to this end, e.g., lifting grippers for lifting and lowering the respective bottle tray (5) and a holding device for the tray stack (77). The lower bottle tray (5) can be released with this holding device for removal from storage and the rest of the tray stack (77) is supported and held. For insertion into storage, the tray stack (77) is held and the lower bottle tray (5) is likewise grasped after the adjustment and is supported and held in contact with the rest of the tray stack (77).

A respective tray conveyor (52) can be connected to one or more storage areas (44, 47). Tray stacks (77) or individual bottle trays (5) can be fed by a tray conveyor (52) to or removed from a storage area (46, 47).

The storage conveyor (50) shown individually in FIG. 5 connects the storage areas (46, 47) and the loading area (48). It has to this end a suitable conveying unit, e.g., parallel guide rails and bilateral belt type conveyors. The storage conveyor (50) further comprises a lifting unit (51), with which said conveying unit can be raised and lowered. One or more, e.g., two bottle trays (5) can be conveyed to and fro in the raised position. An empty bottle tray (5) can be moved to the loading location (48) and transferred to the positioning device (41) in the lowered position. At the same time, a bottle tray (5) located at the loading location (48) can be removed. In addition, positioning units for the bottle tray (5), which interact with the storage device (49), may be present at the storage conveyor (50) in the area around the storage areas (46, 47).

Said layer-forming device (9) may be arranged upstream of the loading device (11). This layer-forming device (9) is shown in more detail in FIG. 2 as well as in FIGS. 6 through 8. It has, e.g., a bottle conveyor (53), a row guide (45) and a row pusher (56) as well as a layer conveyor (58). This may be a separate layer conveyor. In the embodiments shown, the layer-forming device (9) and the loading device (11) may have a common layer conveyor (42, 58).

The bottle conveyor (53) is connected, e.g., to the feed station (2). The bottle conveyor (53) moves the bottles (6), e.g., in an individual bottle row (8) to an area located in front of the layer conveyor (58). The bottle conveyor (53) is configured here such that it forms a discrete bottle row and a so-called layer row (54), which is separated from the other bottles (6) fed and is located at a spaced location in the conveying direction. FIG. 1 shows this configuration.

The layer row (54) is then pushed off by the row pusher (56) at right angles to its extension or in the conveying direction (60) and is pushed onto and brought into contact with a last layer row of the bottle layer (7) being built up. The bottle layer (7) is formed on the layer conveyor (58), which can be moved in a cyclic manner in the process. The row pusher (56) pushes the discrete layer rows (54) one after another onto the layer conveyor (58) to form the bottle layer (7), and said layer conveyor (58) moves on each time by the width of one layer row at the same time or subsequently.

To form a discrete layer row (54) that is separate from the other bottles (6), the bottle conveyor (53) has a conveying unit, e.g., a circulating, bottom-side conveyor belt, and a clamping unit, a stop or the like for the other arriving bottles (6), under which the conveying unit can, e.g., slip through.

Further, an optionally movable and controllable stop may be arranged for the discrete layer row (54) on the front side at the bottle conveyor (53).

The layer-forming device (9) has a row guide (55) for the discrete layer row (54). The row pusher (56) may be configured as a part of the row guide (55). It has, e.g., a pusher strip oriented along the discrete layer row (54) and an adjusting device, which is arranged, e.g., suspended at a traveling carriage and can be moved in the conveying direction (60) by means of a suitable drive. The row pusher (56) is located in the conveying device (60) behind the discrete bottle or layer row (54).

The row guide (55) may have on the other side a raisable and lowerable guide element (57). This element (57) is arranged in front of the discrete layer row (54) when viewed in the conveying direction (60). In the lowered position, the guide element (57) forms a part of the row guide (55) to form the discrete layer row (54). The guide element (57) can then be raised and it makes possible in the raised position the passage of the row pusher (56) and of the discrete layer row (54) in the conveying direction (60). After the return of the row pusher (56) and of the guide element (57) into the starting position, the row guide can be closed and a discrete layer row (54) can again be formed.

According to FIG. 1, a distance, through which the frame element (30) of the layer gripper (25) can reach the rear side of the front bottle layer (7) and contact this, can be created during the formation of the bottle layers (7) between the front and finished bottle layer (7) and the bottle layer (7) formed next. The frame element (30) may perform now, e.g., a pivoting movement.

FIGS. 9 through 12 show the other loading device (11) on the removal side of the storage station (4). The loading device (11) likewise has a layer pusher (25) and a lifting device (34) as well as a layer conveyor (42) of the above-described type.

The cycle takes place in the reverse order during the unloading process. The lifting bottom (18) of the loaded bottle tray (5) is raised with the bottle layer (7), and the bottles (6) dip in the process into the pusher frame (27), which was made available before at the loading area (48) and was widened. After adjusting the frame parts (29, 30, 31), the layer pusher (25) pushes off the bottle layer (7) from the lifting bottom (18), and the lifting bottom can then be lowered, empty, into the bottle tray (5). The unloaded or empty bottle tray (5) can then be removed and a new, loaded bottle tray (5) can be made available at the loading area.

In the embodiment shown, the bottle layers (7) unloaded from the bottle tray (5) are removed in two parallel lines by means of two separate layer conveyors (42). The guide (26) and the layer pusher (25) have the aforementioned second movement axis for this. In addition, a distribution table (33), which extends to the two layer conveyors (42) and on which the unloaded bottle layers (7) can be displaced by the layer pusher (25) at right angles, is arranged following the loading table (32). The layers (7) are shown symbolically in FIGS. 3, 9, 10 and 11.

The removal-side loading device (11) is adjoined by a row-forming device (10). This is present as two such devices in the exemplary embodiments shown, but it is possible, as an alternative, to arrange a single unit or to arrange more than two units. The respective row-forming device (10) and the loading device (11) may have each a respective common layer conveyor (42, 59) with a conveying direction (60).

Figure 12:
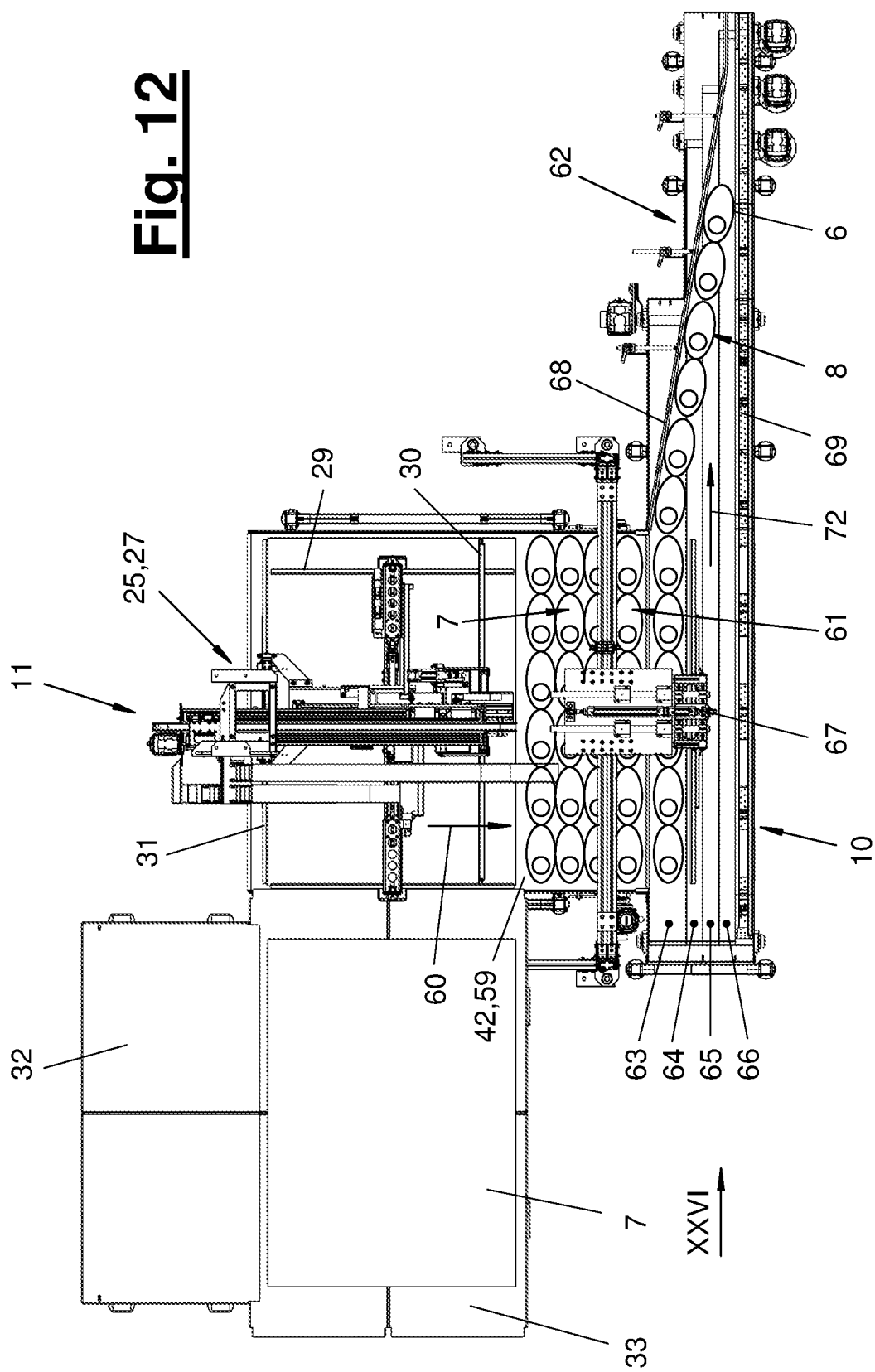
FIG. 12 is a top view of the arrangement according to FIG. 11 with bottles.
Figure 26:
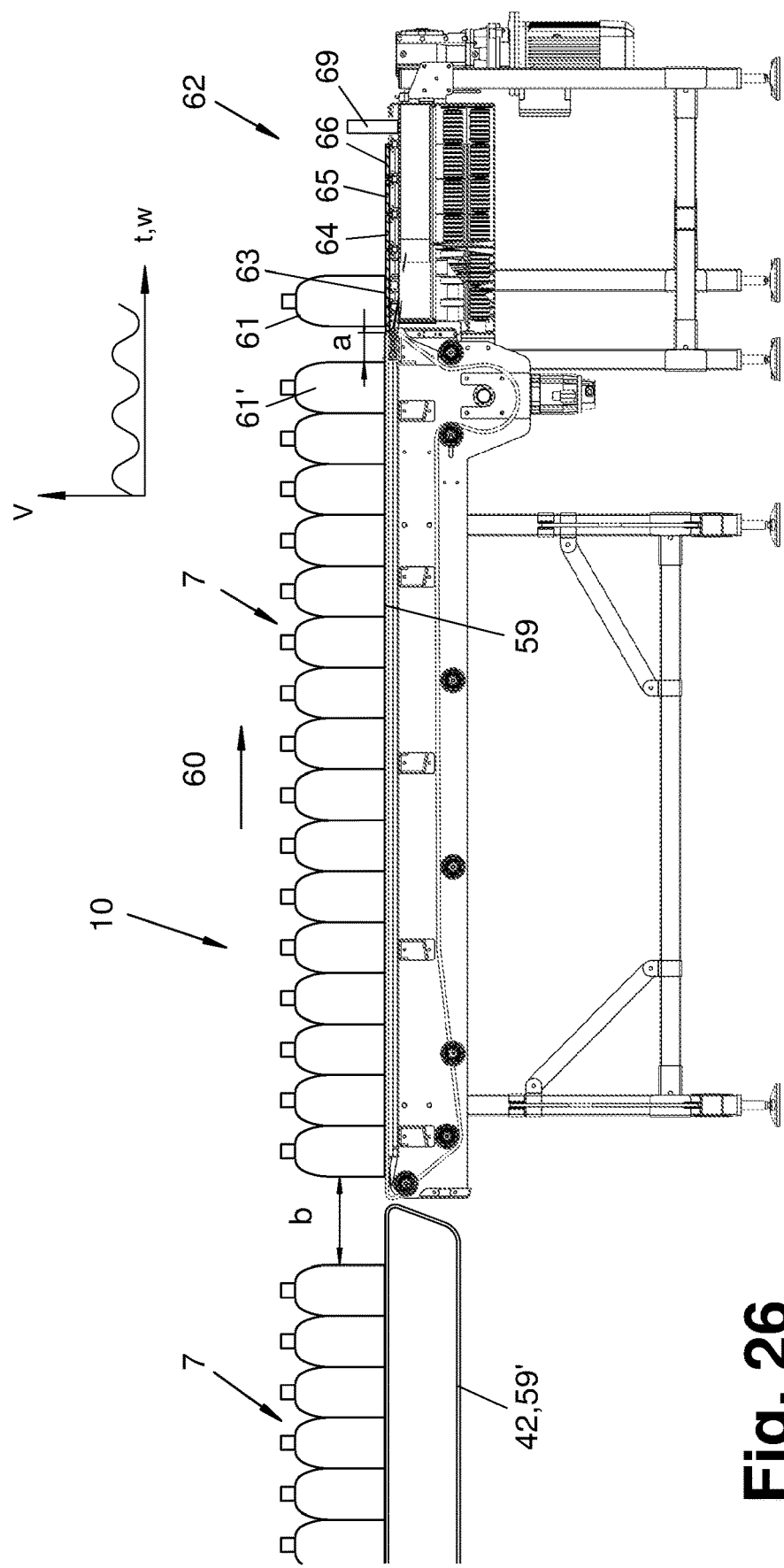

The row-forming device (10) has the function of picking up and removing the respective frontmost layer row (61) of the bottle layer (7) being moved in the conveying direction (60) row by row. This happens in a conveying device (72) that is oriented at right angles to the conveying direction (60). FIG. 12 and FIG. 26 show this function and configuration in a top view and in a front view according to arrow XXVI.

The row-forming device (10) has a conveying device (62) with a plurality of, e.g., four parallel conveyor belts (63-66). These extend in said conveying direction (72). The conveyor belts (63-66) are driven independently. They may run faster than the layer conveyor (59) and the conveyor belt thereof.

The conveying device (62) adjoins the layer conveyor (59) directly or via a push-off strip. When the layer conveyor (59) pushes the frontmost layer row (61) over this limit onto the first conveyor belt (63) running at right angles to the conveying direction (60), this conveyor belt (62) carries along the bottles (6) of the layer row (61) in the conveying direction (72) and pulls them also away from the layer conveyor (59). According to FIG. 26, a distance (a) is formed from the layer row (61') following next due to the pulling off. To compensate this distance (a), the layer conveyor (59) may briefly accelerate and increase the conveying speed until the layer row (61') following next has reached the limit to the conveying device (62). The conveying speed can then be reduced again. The cycle is repeated after pulling off the layer row (61'), so that the conveying speed of the layer conveyor (59) has the pulsating course suggested in the diagram in FIG. 26 over the conveying path or the time.

The conveyor belts (63-66) may have different conveying speeds from one another. There is, for example, a speed gradient, which increases when viewed in the conveying direction. The conveying speed increases continuously from one conveyor belt to the next conveyor belt.

The conveyor belt (63), which is the first conveyor belt in the conveying direction (60) and adjoins the deflection of the layer conveyor (42, 59) directly or via a push-off strip, has, for example, the lowest speed. It may also have the greatest width. The conveyor belts (64, 65, 66) following it in the conveying direction (60) have each a higher speed and a narrower width than the first conveyor belt (63). The outermost conveyor belt (66) has the highest conveying speed. The bottle row (8) released from the row-forming device (10) is ultimately also formed and removed on this conveyor belt (66).

The bottles (6) are received, standing, on the bottom-side conveyor belts (63-66) on their upper runs. The upper runs are always moved in the same conveying direction (72).

The conveying device (62) has, furthermore, a preferably straight guide strip (68) oriented obliquely in relation to the conveying direction (72). This follows, when viewed in the conveying direction (72), the layer conveyor (42, 59). It extends, starting from the layer conveyor (42, 59), over a part of the conveyor belts (63, 64, 65) and preferably reaches up to the outer conveyor belt (66). The oblique position has a directional component in the conveying direction (72).

The layer row (61) picked up by the first conveyor belt (63) is conveyed in the direction (72) and comes into contact with the guide strip (68), and it is deflected obliquely and is pushed over the additional conveyor belts (64, 65). The differences in the speeds of the conveyor belts (63, 64, 65) drive the bottle feed along the oblique guide strip (68).

The guide strip (68) reaches over the first three conveyor belts (63, 64, 65) and ends at or in front of the fourth conveyor belt (66). The obliquely guided bottle row (8) then reaches the last and fastest conveyor belt (66). The bottle row (8) is carried along by this in the conveying direction and is deflected in the process. The bottle row (8) is guided by an edge guide (69) arranged behind the conveyor belt (66) when viewed in the conveying direction (60). The free end of the oblique guide strip (68) may be joined by an additional guiding unit, which acts in a guiding manner on the other side of the conveyor belt (66). The oblique guide strip (68) is shown in the drawings in a somewhat different position, reaching the last conveyor belt (66), for a better view.

The conveying device (62) may, further, have a guide unit (67), which is oriented along the conveying direction (72) and which is arranged at the rear edge of the first conveyor belt (63) when viewed in the conveying direction (60). It guides the layer row (61) located on the first conveyor belt (63) in the conveying direction (72). The guide unit (67) may be able to be adjusted with a suitable adjusting device. It may, for example, be set to different bottle formats and be also removed as needed.

The conveyor belts (63, 64, 65, 66) may have different longitudinal extensions when viewed in the conveying direction (72). This makes place available for arranging the respective corresponding belt drives. The last conveyor belt (66) has the greatest length and adjoins a row conveyor (71) leading farther. This then conveys, according to FIG. 1, the bottle row (8) to the treatment station (3).

The row-forming device (10) can be operated in different manners. This may depend, e.g., on the shapes of the bottles. In one variant, the layer conveyor (59) and the conveying device (62) can be moved each intermittently and in a cyclic manner. The layer conveyor (59) pushes now the frontmost layer row (61) over the currently stopped first conveyor belt (63). The layer row (61) can be brought into contact with the correspondingly positioned guiding unit (67). The layer conveyor (59) then stops, while the conveying device (62) is activated and the bottles (6) of the layer row (61) are removed in the conveying direction (72). After removal of the layer row (61), the conveying device (62) will again stop, and the cycle with then start anew and the layer row (61') following next is pushed onto the conveying device (62).

In another variant, the layer conveyor (59) and the conveying device (62) with their conveyor belts (63-66) can run each continuously. The layer conveyor (59) pushes the front layer row (61) over said limit in the above-described manner until it is carried by the first conveyor belt and is removed in the conveying direction (72). The layer conveyor (59) can run at a constant speed or may have the aforementioned pulsating, e.g., sinusoidal profile. A cycled profile with start/stop phases is also possible. The conveyor belts (63-66) may run permanently and at a constant speed. As an alternative, the conveyor belts (63-66) may also have a variable and especially pulsating speed profile.

FIG. 26 shows, in addition, an embodiment of the row-forming device (10), in which a plurality of layer conveyors (59, 59') are arranged one after another in the conveying direction (60). The one front layer conveyor (59) adjoins, e.g., the conveying device (62). The rear layer conveyor (59') is coupled, e.g., with the loading device (11) and takes over the layer (7) unloaded from the bottle tray (5). The layer conveyor (59') may form the layer conveyor (42) of the loading device (11) or it may be an intermediate conveyor.

Due to the cyclic unloading of the bottle tray (5), the unloaded bottle layers (7) have a distance (b) from one another in the conveying direction, which distance is indicated in FIG. 26.

In order to make it possible to form bottle rows (8) continuously and without gaps as much as possible, the distance (b) can be reduced. The layer conveyor (59') positioned upstream can run to this end faster from time to time than the downstream layer conveyor (59). It can thus bring the bottle layer (7) being conveyed to the bottle layer (7) located on the layer conveyor (59) in a tightly adjoining arrangement.

Figure 27:
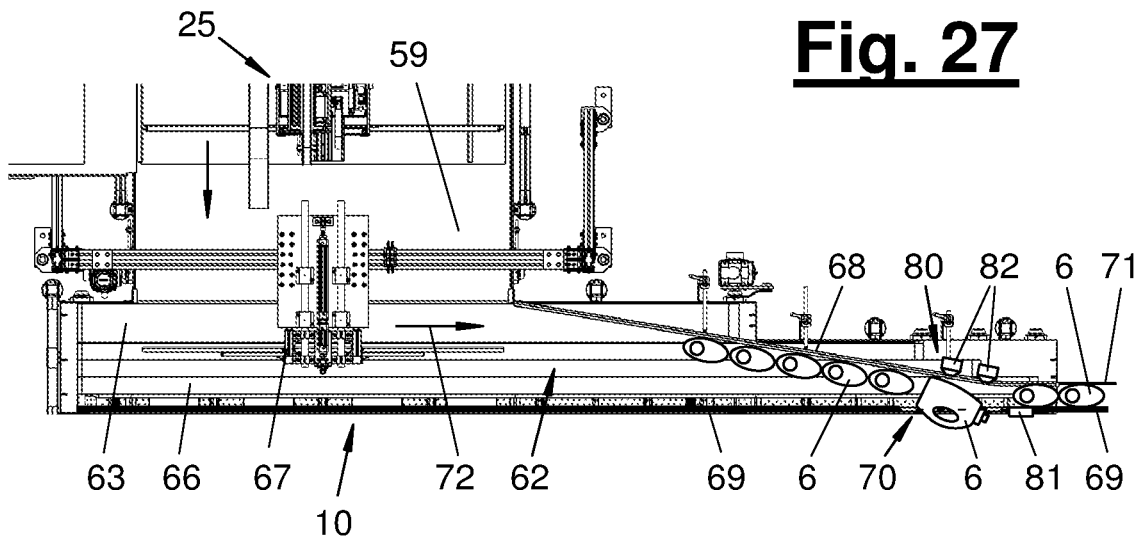
FIG. 27 is a side view of a row-forming device with a removing device.

FIG. 27 shows a row-forming device (10) with an outlet (70) for bottles (6) that have fallen over or are abnormal in another manner. A removing device (80) may be arranged at the outlet (70). The outlet (70) may be located, e.g., at the transition of the conveying device (62) into the row conveyor (71). A "bottleneck" can be formed here by the oblique guide strip (68). The outlet (70) may be formed as an opening in an edge guide (69) located opposite the guide strip (68). The edge guide (69) may be arranged at the row conveyor (71) and optionally at the conveying device (62), especially at the last guide belt (66).

A bottle (6) that has fallen over or is otherwise abnormal can be detected by a sensor (81). Depending on the result of the detection, an ejector (82) of the removing device (80) can be activated for ejecting this bottle (6).

The sensor (81) is configured, e.g., as an optical sensor, which is arranged in or at the edge guide (69) and emits a detection beam in the direction of the edge guide (69) and via the outlet (70). A fallen-over bottle (6) projects farther away from the oblique guide strip (68) than a bottle (6) standing correctly and upright. The fallen-over bottle (6) interrupts thereby the detection beam and triggers the ejection function. Correctly standing bottles (6) being conveyed do not enter the area of the detection beam and do not trigger the ejection function.

The sensor (81) may be configured as an optical sensor in the manner of a reflected light scanner or in another manner. The ejector (82) may comprise, e.g., one or more blowing nozzles and can blow the bottle to be removed through the outlet (70) into an external collection container or the like with an air jet. The ejector (82) may have, as an alternative, a different configuration, e.g., a configuration as an extensible flap or ram.

The orientation of the bottles (6) in their conveying direction may change during the above-described pull-off of the bottles (6) from the front layer row (61) from the layer conveyor (59). The bottles (6) may, for example, rotate about their vertical axis, e.g., due to contact and carrying by the conveyor belt (66), and this rotation does not always take place or it does not always take place to the same extent. Due to said change in orientation, the bottle neck (6") may come to be located in front of or behind the center of the bottle in the conveying direction. A constant orientation of the bottles is favorable for the subsequent treatment, e.g., filling, of the bottles (6).

Figure 28:
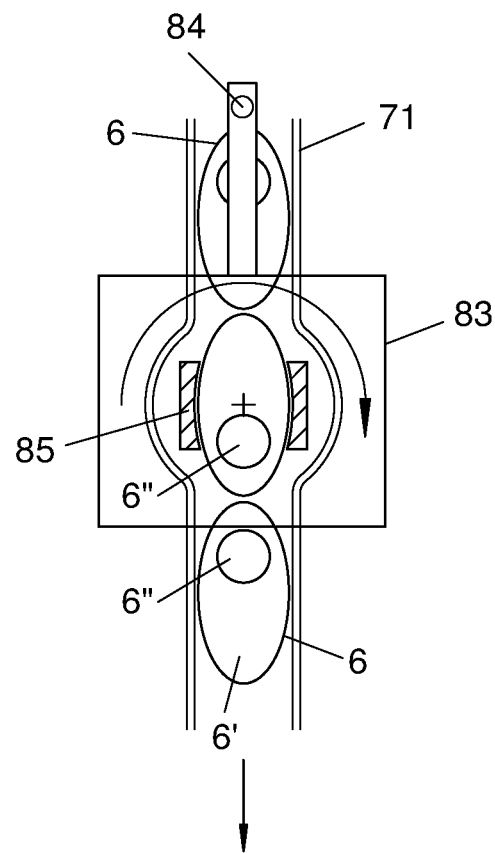
FIG. 28 is a top view of a row conveyor with a turning device.

To eliminate possible incorrect orientations of bottles (6), a turning device (83), which can correct an incorrect orientation, may be arranged according to FIGS. 1 and 28 at the row conveyor (71) or at another suitable location. It can grasp, for example, the bottle (6) in question preferably on the side and turn it by 180° about its vertical axis. The lateral guide of the bottle or row conveyor (71) has a corresponding bulge in the turning area. The turning unit (85) is formed, for example, by controllably driven grasping jaws, which can be brought laterally into contact with the bottle (6), especially the bottle body (6'), whose shape is possibly adapted, and which can rotate about said vertical axis by 180°. The turning operation can be carried out very rapidly and during the conveying of the bottles.

The turning device (43) may have a sensor (84), which is located in front of the turning unit (85) and with which the orientation of the arriving bottles can be detected and an incorrect orientation can be detected. The turning unit (85) can be actuated correspondingly via the sensor (84) and an analysis unit.

Various modifications of the embodiments shown and described are possible. The storage station (4), the layer-forming device (9), the row-forming device (10) and the loading device (11) are independent inventive components. These may also be manufactured and sold individually. They may be used to retrofit or retool existing bottle treatment plants (1).

Further, it is possible to combine the storage station (4), the layer-forming device (9), the row-forming device (10) and the loading device (11) with one another in any desired manner and to any desired extent. Conventional components may also be used in such a combination. The row-forming device (10) may have, e.g., a conveying device (62) with only one broad conveyor belt.

A storage station (4) may be arranged, e.g., locally separated from a loading device (11). The bottle trays (5) may be loaded and unloaded in this case outside the storage station at an external loading location and are conveyed to and back from the storage station (4) with a separate conveying technology for insertion and removal. The storage station (4) may have any other desired configuration in this case.

Further, it is possible to configure a loading device (11) in another and conventional manner with grasping devices and to combine it with a layer-forming device (9) and/or with a row-forming device (10) of the above-described and claimed type.

Further, a bottle tray (5) equipped with a movable lifting bottom (18) may be modified. The tray bottom (15) may be eliminated in favor of an individual, large lower passage opening. The side wall (12) is configured in this case as a circumferentially extending frame, which may have an upper tray opening (13) and a free lower passage opening (16) of an essentially equal size. The configuration of the side wall (12) may also vary in favor of straight side walls or another configuration. The movable lifting bottom (18) may be arranged at the lower edge (24) of the side wall (12) and be held in a suitable manner, e.g., by bent-over support edges at the side wall. The loading device (11) may be correspondingly adapted now and it may otherwise have the above-described and claimed configuration. The layer-forming device (9) and/or the row-forming device (10) of the above-described and claimed type may be combined as well.

On the other hand, the described and claimed loading device (11) may be combined with other and conventional layer-forming devices (9) and/or row-forming devices (10).

While specific embodiments of the invention have been shown and described in detail to illustrate the application of the principles of the invention, it will be understood that the invention may be embodied otherwise without departing from such principles.

LIST OF REFERENCE CHARACTERS

1 Bottle treatment plant
2 Feed station
3 Treatment station
4 Storage station
5 Bottle tray
6 Bottle
6' Bottle body
6" Bottle neck, bottle opening
7 Bottle layer
8 Bottle row
9 Layer-forming device
10 Row-forming device
11 Loading device
12 Side wall
13 Tray opening
14 Recess (indentation)
15 Tray bottom
16 Passage opening
17 Strut
18 Lifting bottom
19 Bottom centering
20 Centering unit, centering bar
20' Centering unit, centering strip
21 Tray centering
22 Corner element
23 Upper edge
24 Lower edge
25 Layer pusher
26 Guide
27 Pusher frame
28 Drive
29 Frame part, lateral
30 Frame part, front-side
31 Frame part, rear-side
32 Loading table
33 Distributing table
34 Lifting device
35 Frame
36 Lifting unit
37 Lifting carrier, strap-like
38 Lifting carrier frame
39 Lifting drive
40 Adhering holding element, suction cup
41 Positioning device
42 Layer conveyor
43 Tray storage unit
44 Tray storage unit
45 Frame
46 Storage area
47 Storage area
48 Loading area
49 Storage device
50 Storage conveyor
51 Lifting unit
52 Tray conveyor
53 Bottle conveyor
54 Layer row
55 Row guide
56 Row pusher
57 Guide element
58 Layer conveyor, conveyor belt
59 Layer conveyor, conveyor belt
59' Layer conveyor, conveyor belt
60 Conveying direction
61 Layer row, frontmost
61' Layer row, next following
62 Conveying device
63 Conveyor belt
64 Conveyor belt
65 Conveyor belt
66 Conveyor belt
67 Guide unit
68 Guide strip, oblique
69 Edge guide
70 Outlet
71 Row conveyor
72 Conveying direction 73 Panel
74 Corner column
75 Collar
76 Edge reinforcement
77 Tray stack
78 Tray stack storage unit
79 Stack conveyor
80 Removing device
81 Sensor
82 Ejector
83 Turning device
84 Sensor
85 Turning unit
a Distance of layer rows
b Distance between bottle layers

What is claimed is:

1. A bottle tray comprising:
    an upright circumferentially extending side wall with an upper tray opening;
    a tray bottom fixedly connected to the side wall, wherein the bottle tray is configured for receiving a bottle layer;
    a loosely inserted, movable lifting bottom that lies in the loaded state of the bottle tray on the tray bottom, the bottom having a plurality of passage openings for a lifting device for generating a relative lift between the side wall and the lifting bottom, wherein the tray bottom has a perforated plate or a plurality of struts, which are located at spaced locations from one another and enclose the passage openings, said perforated plate or a plurality of struts being fastened to the side wall;
    a bottom centering element acting between the tray bottom and the lifting bottom; and
    a tray centering device configured to center a meshing of the bottle tray with a tray stack comprised of another bottle tray.

2. A bottle tray in accordance with claim 1, wherein:
    the tray bottom is arranged in a central area of a height of the side wall; and
    the tray bottom adjoins an indentation of the side wall and is attached.

3. A bottle tray in accordance with claim 1, wherein the bottom centering device comprises centering units arranged obliquely in corner areas of the tray bottom and the lifting bottom.

4. A storage station for storing a plurality of empty and/or loaded bottle trays comprising an upright circumferentially extending side wall with an upper tray opening, a tray bottom fixedly connected to the side wall, wherein the bottle tray is configured for receiving a bottle layer, a loosely inserted, movable lifting bottom that lies in the loaded state of the bottle tray on the tray bottom, the bottom having a plurality of passage openings for a lifting device for generating a relative lift between the side wall and the lifting bottom, wherein the tray bottom has a perforated plate or a plurality of struts, which are located at spaced locations from one another and enclose the passage openings, said perforated plate or a plurality of struts being fastened to the side wall, and a bottom centering element acting between the tray bottom and the lifting bottom, the storage station comprising:
    one or more tray storage units with an integrated loading area for loading and/or unloading the bottle tray;
    a loading device comprising a movable layer pusher configured to push a bottle layer, wherein the loading device is arranged at the tray storage unit; and
    a lifting device configured to provide a relative lifting movement between the side wall and the movable lifting bottom of the bottle tray, wherein the lifting device is arranged at the loading area.

5. A storage station in accordance with claim 4, wherein the tray storage unit comprises at least one storage area for receiving a tray stack of a plurality of bottle trays and a storage conveyor configured to convey bottle trays, the storage conveyor connecting the respective storage area to the loading area and to the lifting device.

6. A storage station in accordance with claim 5, wherein the storage conveyor comprises a lifting unit.

7. A storage station in accordance with claim 4, further comprising:
    one or more tray conveyors; and
    a stack storage unit with one or more stack conveyors, wherein the one or more tray storage units are separately arranged.

8. A storage station in accordance with claim 4, wherein the layer pusher and the lifting device are controlled such that the layer pusher pushes a bottle layer onto the lifting bottom or pushes a bottle layer off from the lifting bottom with the lifting device positioning the lifting bottom in the bottle tray in a position favorable for pushing at the upper tray opening.

9. A storage station in accordance with claim 4, wherein the loading device comprises a positioning device for positioning a bottle tray at the lifting device.

10. A storage station in accordance with claim 4, wherein the loading device comprises a layer conveyor arranged upstream or downstream of the lifting device and is configured for conveying a bottle layer.

11. A storage station in accordance with claim 4, wherein the lifting device comprises:
    a stationary or vertically movable lifting unit configured to grasp through the passage opening and act on the lifting bottom; and
    a plurality of switchable and adhering holding elements configured to act on the lifting bottom, the holding elements being arranged at the lifting unit with a two-dimensional distribution.

12. A storage station in accordance with claim 11, wherein the adhering holding element is configured as a suction cup and/or as an electromagnet.

13. A storage station in accordance with claim 4, further comprising a layer-forming device configured to form a bottle layer from a plurality of layer rows arranged, the layer-forming device being arranged upstream of the storage station.

14. A storage station in accordance with claim 4, further comprising a row-forming device configured to form a bottle row from a bottle layer, the row-forming device being arranged downstream of the storage station.

15. A storage station in accordance with claim 14, wherein the row-forming device comprises an outlet and a removing device configured to remove bottles that have fallen over or are otherwise abnormal.

16. A storage station in accordance with claim 14, wherein the row-forming device comprises a turning device configured to turn for bottles having an incorrect orientation.

17. A storage station in accordance with claim 14, wherein the row-forming device comprises:
    a layer conveyor with a layer conveying direction; and
    an adjoining conveying device with a plurality of parallel conveyor belts running in a same direction and with a adjoining conveying direction oriented at right angles to the layer conveying direction, wherein the layer conveyor has a variable and periodically pulsating conveying speed.

18. A process for storing a plurality of empty and/or loaded bottle trays in a storage station, the process comprising the steps of:
- providing a plurality of empty and/or loaded bottle trays comprising an upright circumferentially extending side wall with an upper tray opening, a tray bottom fixedly connected to the side wall, wherein the bottle tray is configured for receiving a bottle layer, a loosely inserted, movable lifting bottom that lies in the loaded state of the bottle tray on the tray bottom, the bottom having a plurality of passage openings for a lifting device for generating a relative lift between the side wall and the lifting bottom, wherein the tray bottom has a perforated plate or a plurality of struts, which are located at spaced locations from one another and enclose the passage openings, said perforated plate or a plurality of struts being fastened to the side wall, and a bottom centering element acting between the tray bottom and the lifting bottom;
- providing the storage station with one or more tray storage units, an integrated loading area, at which the bottle trays are loaded and/or unloaded with a bottle layer, a loading device with a movable layer pusher and a lifting device arranged at the tray storage unit;
- providing the storage station so as to comprise one or more tray storage units with an integrated loading area for loading and/or unloading the bottle tray, a loading device comprising a movable layer pusher configured to push a bottle layer, wherein the loading device is arranged at the tray storage unit, and a lifting device configured to provide a relative lifting movement between the side wall and the movable lifting bottom of the bottle tray, wherein the lifting device is arranged at the loading area;
- lifting and lowering lifting bottom relative to the side wall with the lifting device arranged at the loading area; and
- pushing a bottle layer onto the lifting bottom or pushing a bottle layer off from the lifting bottom with the layer pusher.

19. A process in accordance with claim 18, wherein:
- the tray storage unit has at least one storage area in which a plurality of bottle trays are received in a tray stack;
- the bottle trays are conveyed by a storage conveyor between the loading area and the storage area or storage areas;
- the bottle trays are stacked up and/or unstacked in the storage area or storage areas with a storage device; and
- the tray stacks are conveyed to and fro by a tray conveyor between the storage area or storage areas and a stack storage unit.

20. A bottle tray comprising:
- an upright circumferentially extending side wall with an upper tray opening;
- a tray bottom fixedly connected to the side wall, wherein the bottle tray is configured for receiving a bottle layer;
- a loosely inserted, movable lifting bottom that lies in a loaded state of the bottle tray on the tray bottom, the bottom having a plurality of passage openings for a lifting device for generating a relative lift between the side wall and the lifting bottom, wherein the tray bottom has a perforated plate or a plurality of struts, which are located at spaced locations from one another and enclose the passage openings, the perforated plate or a plurality of struts being fastened to the side wall; and
- a bottom centering element acting between the tray bottom and the lifting bottom, wherein the bottom centering device comprises centering units arranged obliquely in corner areas of the tray bottom and the lifting bottom.

* * * * *